(12) United States Patent
Camacho

(10) Patent No.: US 11,316,704 B1
(45) Date of Patent: *Apr. 26, 2022

(54) ENHANCED CERTIFICATE AUTHORITY

(71) Applicant: Urayoan Camacho, Bayamon, PR (US)

(72) Inventor: Urayoan Camacho, Bayamon, PR (US)

(*) Notice: Subject to any disclaimer, the term of this patent is extended or adjusted under 35 U.S.C. 154(b) by 97 days.

This patent is subject to a terminal disclaimer.

(21) Appl. No.: 16/588,403

(22) Filed: Sep. 30, 2019

Related U.S. Application Data

(63) Continuation of application No. 15/953,806, filed on Apr. 16, 2018, now Pat. No. 10,430,786.

(51) Int. Cl.
*H04L 29/06* (2006.01)
*H04L 9/32* (2006.01)
*H04L 9/30* (2006.01)

(52) U.S. Cl.
CPC .......... *H04L 9/3268* (2013.01); *H04L 9/3073* (2013.01); *H04L 63/0823* (2013.01)

(58) Field of Classification Search
CPC .. H04L 9/3268; H04L 9/3073; H04L 63/0823
See application file for complete search history.

(56) References Cited

U.S. PATENT DOCUMENTS

| | | | | |
|---|---|---|---|---|
| 7,457,950 B1* | 11/2008 | Brickell | ............... | G06Q 30/018 713/156 |
| 2010/0088507 A1* | 4/2010 | Cho | ................... | H04L 63/1483 713/156 |
| 2013/0111572 A1* | 5/2013 | Gaddam | ............... | H04L 67/142 726/7 |
| 2013/0276058 A1* | 10/2013 | Buldas | ................ | H04L 63/0876 726/2 |

* cited by examiner

*Primary Examiner* — Shawnchoy Rahman
(74) *Attorney, Agent, or Firm* — Luis Figarella

(57) ABSTRACT

An enhanced certificate authority system and method allows for the enhanced security, validation and Multi-Factor Authentication of user's within a digital signature and transaction system through the creation and management of a user's Digital Identity certificate so that through an enhanced certificate authority a user's identity and bona fides may be both protected and established across a diversity of electronic devices and transactions.

16 Claims, 30 Drawing Sheets

Digital Life Framework System

- ID Provider protocols
  - OPEN ID CONNECT
  - OAUTH
  - Custom

- Authentication and authorization
  - LDAP
  - TAT & TAP
  - Custom protocols

- Encryption Key Management
  - Hardware Security Modules
  - Software
  - PRNG's

- Certification Authority Farms
  - PKI Lifecycle Management using SOA
  - International, State, Federal
  - Root, Policy, Sub's, Issuers, others, CA

Figure 20

- Digital Signer
  - Transaction Signer for Info broker
  - Information Signer for system
  - Server and client base for user
- Access Control Services
  - Logical
  - Physical
- Credential Management
  - Validation and Verification
  - Biometric Service Provider
  - Device Management System
  - Device Management (Smart, dumb, custom, PAC, POS, Beacon, Biomech)
  - Card Management System
  - Device Secure Tracking and geolocation
- Compliance Management
  - Policies and procedures
  - Audit management lifecycle
  - Incident response
  - 3rd Parties compliance external breaches

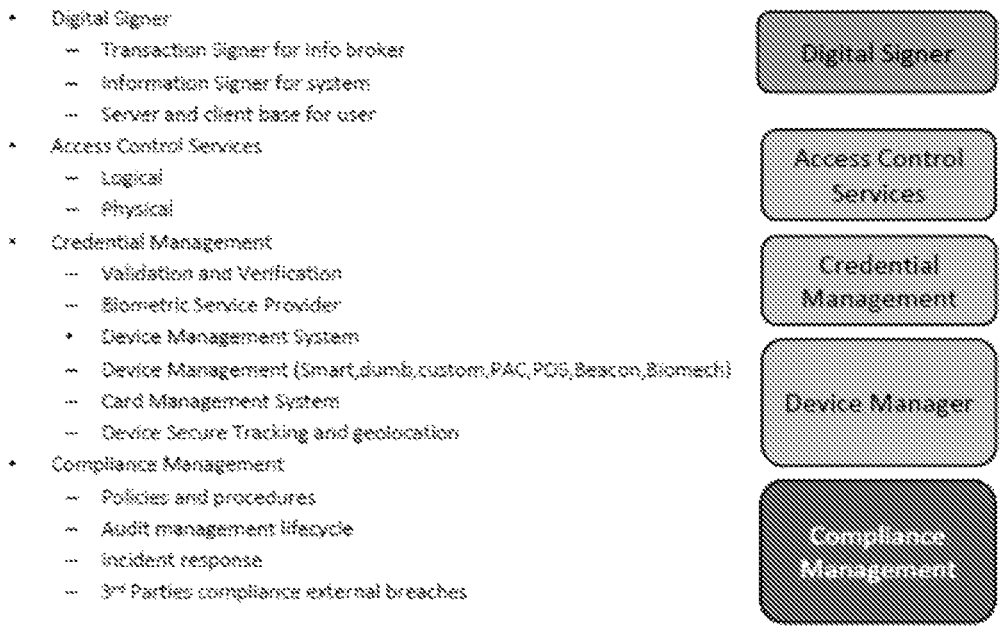

Figure 21

ENHANCED CERTIFICATE AUTHORITY

CROSS-REFERENCE TO RELATED APPLICATIONS

This application is a continuation of co-pending U.S. patent application Ser. No. 15/953,806 titled "Enhanced Certificate Authority", filed on Apr. 17, 2018, the disclosure of which is herein incorporated by reference in its entirety.

PATENTS CITED

The following documents and references are incorporated by reference in their entirety Ibraimi et al (U.S. Pat. Appl. No. 2013/0073860), Saxena et al (U.S. Pat. Appl. No. 2012/0159172), Hsien (U.S. Pat. Appl. No. 2013/0145166), Huotari et al (U.S. Pat. No. 7,813,717), Candelore et al (U.S. Pat. Appl. No. 2011/0055577), Wheeler et al (U.S. Pat. Appl. No. 2004/0128508), Ramalingam et al (U.S. Pat. No. 8,341,029), Chamberlain (U.S. Pat. No. 8,417,958), Varga (U.S. Pat. No. 8,332,322), Brandt et al (U.S. Pat. Appl. No. 2013/0159723), Labaton (WO 99/22362) and Jarvie et al (U.S. Pat. No. 8,473,735).

FIELD OF THE INVENTION

The present invention relates to a system for creating and managing a user's Digital Identity certificate so that through an enhanced certificate authority a user's identity and bona fides may be both protected and established across a diversity of electronic devices and transactions.

DESCRIPTION OF THE RELATED ART

The proliferation of electronic forms of identification and transactions, coupled with the increased needs of privacy and authentication, makes for an ever increasing necessity for authentication tools that provide users with the ability to digitally sign and authenticate transactions and documents with their electronic authority via some form of digital signature or electronic postmark. Such methods have been traditionally used to authenticate the identity of the sender of a particular message or to authenticate the time/date at which the message was created.

Increasingly, however, it is not only important to establish the identity and time/date of creation of an electronic item, but also critical to update it as time goes along. Looking at the emission of Digital Certificates (CERT), a particular problem resides in the relatively long duration of their validity (often one to two years), time during which many things about a user may change (Last names, address, valid licensatures, etc.). Simply making CERT last less time would overload the present validation processes.

What is required, is a system and method through which a long lasting validation certification may be accomplished initially, but where CERTs for open market digital signatures are issued for a short period of time based on a one or few transactions whose data is optionally validated and Multi-Factor Authenticated at the time of issuance of said Transaction Certificate.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a computerized system for managing digital certificates, said computerized system comprising one or more communicatively coupled processors, said one or more processors forming a Certificate authority computer system (CACS) configured to perform the steps of: receiving, at said computer system, a request for a Proxy digital certificate (PCERT) from a user desiring said authorized PCERT from said Certificate Authority, said request containing one or more proxy request data elements, sad proxy request data elements comprising the actual data for each user related data field and/or a pointer to the location of said data, said user data information being required by the computer system to accomplish (directly or via third parties) the one or more registration validation actions necessary to establish the bona fides of said user and perform said user registration within the system; providing, upon said bona fides satisfaction, said user with said (PCERT), any suitable PCERT ancillary data and one or more PCERT data elements associated with said one or more proxy request data elements; receiving, by said CA computer system, a request for a Transactional Digital Certificate (TCERT) from a user, said request containing the desired one or more TCERT user data elements and establishing the existence of a valid PCERT, performing certificate validation of one or more of said TCERT request data elements, said PCERT data elements and/or said PCERT, and upon acceptance generating said TCERT digital certificate and any suitable TCERT ancillary data for said user; Transmitting, by said CA computer system, said TCERT digital certificate and any appropriate TCERT ancillary data to said user.

In another aspect, said TCERT request data elements are comprised of one or more of the following possible TCERT data elements to be included in said TCERT; actual user data and/or a pointer to the location of said user data and/or user data field names and/or tokenized values and/or visual references to data; and if a portable PCERT and/or TCERT is desired, said PCERT ancillary data and/or said TCERT ancillary data may contain a CA generated PrK/PubK key pair to be communicated to said user. In yet another aspect, said request for a certificate validation of said TCERT request data elements and said PCERT include establishing the validity of each said TCERT data element at the time of said TCERT request; and said certificate validation of said TCERT includes said request being digitally signed by said user using said PCERT. In another aspect, said certificate validation of said TCERT request data elements and said PCERT include in addition the real-time multi-factor authentication (MFA) of said user, wherein said MFA includes at least one of the following user interactions: telephonic, password, biometric, token (H/W and/or S/W), Password, Pincode, One Time Password, Biometrics (including Face, Finger, Iris, Veins, Voice and others), Machine generated unique codes, Machine Digital Signature, Machine Digital Signature on a secured cryptographic device token and/or Machine generated Unique Code on Secure Cryptographic Device token, LDAP, other authentication and/or authorization servers.

In one aspect, the invention is about a computerized system for managing digital certificates, said computerized system comprising: one or more communicatively coupled processors, said one or more processors forming a Certificate authority computer system (CACS) configured to perform the steps of: receiving, at said computer system, a request for a Proxy digital certificate (PCERT) from a user desiring said authorized PCERT from said Certificate Authority, said request containing one or more proxy request data elements, sad proxy request data elements comprising the actual data for each user related data field and/or a pointer to the location of said data, said user data information being required by the computer system to accomplish (directly or via third parties) the one or more registration validation actions necessary to establish the bona fides of said user and perform said user registration within the system; providing, upon said bona fides satisfaction, said user with said (PCERT), any suitable PCERT ancillary data and one or more PCERT data elements associated with said one or more proxy request data elements; receiving, by said CA computer system, a request for a Transactional Digital Certificate (TCERT) from a user, a PCERT, but wherein said request TCERT request data elements are comprised of one or more of the following possible TCERT data elements: a pointer to the location of said user data and/or user data field names and/or tokenized values and/or visual references to data; performing certificate validation of one or more of said TCERT request data elements, said PCERT data elements and/or said PCERT, and upon acceptance transmitting to said user the values of the data fields included in said TCERT request; transmitting, to said CA a digitally signed request including said CA provided data values, said user PubK and digitally signed by the User; receiving, said data from said user, and generating a TCERT using said information; transmitting, by said CA computer system, said TCERT digital certificate and any appropriate TCERT ancillary data to said user.

In one aspect, the invention is about a method of managing digital certificates, by a computer system, said method comprising the steps of; providing one or more communicatively coupled processors, said one or more processors forming a Certificate authority computer system (CACS); receiving, at said computer system, a request for a Proxy digital certificate (PCERT) from a user desiring said authorized PCERT from said Certificate Authority, said request containing one or more proxy request data elements, sad proxy request data elements comprising the actual data for each user related data field and/or a pointer to the location of said data, said user data information being required by the computer system to accomplish (directly or via third parties) the one or more registration validation actions necessary to establish the bona fides of said user and perform said user registration within the system; providing, upon said bona fides satisfaction, said user with said (PCERT), any suitable PCERT ancillary data and one or more PCERT data elements associated with said one or more proxy request data elements; receiving, by said CA computer system, a request for a Transactional Digital Certificate (TCERT) from a user, said request containing the desired one or more TCERT user data elements and establishing the existence of a valid PCERT, performing certificate validation of one or more of said TCERT request data elements, said PCERT data elements and/or said PCERT, and upon acceptance generating said TCERT digital certificate and any suitable TCERT ancillary data for said user; transmitting, by said CA computer system, said TCERT digital certificate and any appropriate TCERT ancillary data to said user.

Other features and advantages of the present invention will become apparent upon examining the following detailed description of an embodiment thereof, taken in conjunction with the attached drawings.

BRIEF DESCRIPTION OF THE DRAWINGS

FIG. 20 shows further ID Management and ID Broker components, according to an exemplary embodiment of the invention.

FIG. 21 shows further ID Management and ID Broker components, according to an exemplary embodiment of the invention.

Figure 1:
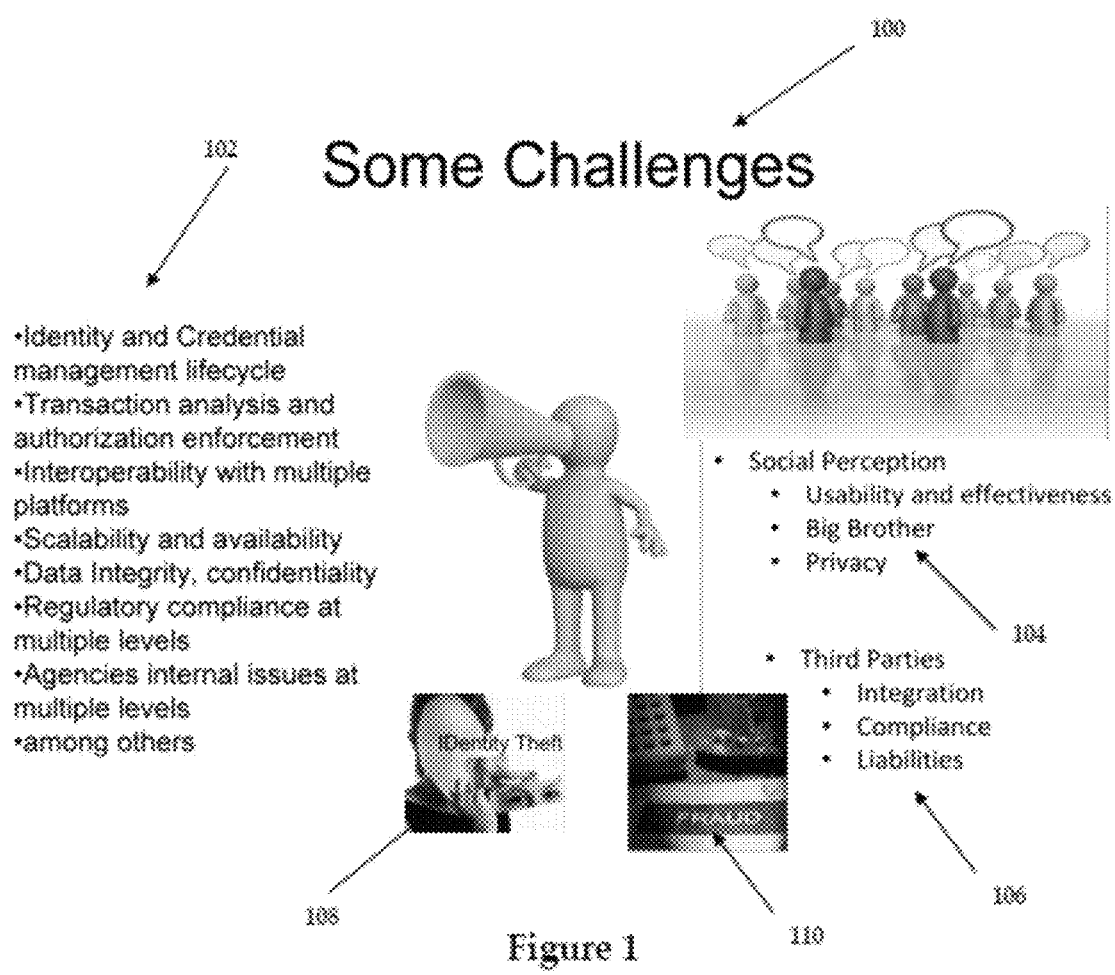
FIG. 1 shows some of the Challenges found by this type of systems, according to an embodiment of the invention.

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

As the physical and virtual worlds merge, humans increasingly find the necessity to track multiple identities (multiple emails, Social Media personalities and avatars, etc.). The increasingly complex world of National and International privacy regulations contributes by effectively forcing humans not only to keep multiple password lists, but an ever increasing complicated web of permissions, certificates, etc.

Referring to FIG. 1, we see some of the typical challenges. These include challenges 102 related to actual accounts (e.g. Identity and Credential challenges, Transactions, Scalability, etc.), challenges driven by Social perception 104 and those driven by 3rd party integration 106, in an effort to control ID Theft 108 and Fraud 110. In effect, we need a Digital Life Framework (DLF) to manage the various portions of this digital life. In effect, the DLF is a human interaction and transaction system and method, which shows and implements a number of approaches to ensure the secure handling of digital signatures as well as the interaction of personal data with the establishment of appropriate transaction security.

There is a need to make available access to personal/corporate information to all users on the internet (be it fixed and/or mobile platforms) via access to multiple personal and corporate platforms (including all government, corporate, personal and other services) in a form where the users (be they citizens or corporations) will need to provide basic information only once and in an integrated manner. In this fashion, we could broaden the efforts to place the largest possible amount of government and/or corporate forms online, reducing handling cost and human error.

Such a system would empower Corporations as well as the Federal, State, County or City government entities to provide a true one stop shop where all citizen information is available and where consumers may go check what information about them is available as may control/modify it. In one embodiment, we can imagine a user removing any mental diagnosis from the approved HIPAA data fields, unless the agency requesting it is cleared to obtain such information.

The challenges of doing the above include providing solutions to Identity and Credential management lifecycle, Transaction analysis and authorization enforcement, Interoperability with multiple platforms, Scalability and availability, Data Integrity, confidentiality, Regulatory compliance at multiple levels, Agencies internal issues at multiple levels, among others.

Of course the above is complicated through Social Perception, Usability and effectiveness, "Big Brother" watching syndrome and various privacy regulations and laws. Add to it the various Third Parties concerns (e.g. Integration, Compliance, Liabilities), and we see the importance of a conscientious solution.

Any proposed cost effective solution needs to also avoid potential side effects (e.g. unauthorized access by unrelated parties). Such issues have been demonstrated in events like that of May 30, 2011: "Hackers use stolen RSA information to hack Lockheed Martin" (www.dailytech.com), and Oct. 9, 2012: "The South Carolina Department of Revenue today announced that approximately 3.6 million Social Security numbers and 387,000 credit and debit card numbers have been exposed in a cyber attack . . . " (www.sctax.org/newsreleases/). An optimal solution does not rely on any one technology, but incorporates several components.

The proposed solution is an integrated secure logical and physical access with multi-factor authentication, including Role based, Biometrics, Smart Cards and/or Tokens. The Secure document management would include both Document integrity and confidentiality as well as Integration with third party Document Management Systems.

In one embodiment, such a complete identity and credential management system (a Digital Life Framework or DLF) would be used. In addition to a full Application Programming Interface (API) for integration with authorized third parties, as well as Credential for secure system access (e.g. Employees, Citizens, Authorized third parties, etc.), such a system could utilize existing PAC's infrastructure so that transaction analysis with secure enforceability would be accomplished. The above would include a full Public Key Infrastructure (PKI) lifecycle (as well as other types and methodologies of digital signatures), including digital signatures for both users and devices. In addition, regulatory compliance would include complying with laws such as Privacy Act, HIPAA, FISMA, FERPA, Webtrust & others.

Digital signatures (DS) have become an important part of e-commerce. The origination of a digital signature generally includes: (1) the calculation of a message digest—such as a hash value; and (2) the subsequent encryption of the message digest. The message digest is digitally signed by an electronic device using a private key (PrK) of a key pair used in public-private key cryptography (also known as asymmetric cryptography). The resulting ciphertext itself usually constitutes the digital signature, which typically is appended to the message to form part of the Electronic communication (EC).

The second part of originating the DS—using encryption with a private key—is referred to herein as "generating" the digital signature, and the combined two steps is referred to herein as "originating" the digital signature. Furthermore, while the generation of the digital signature is conventionally understood as the encryption of the message digest, it is contemplated herein that generating the digital signature also may include simply encrypting the message rather than the message digest. Digital signatures are important because any change whatsoever to the message in an EC is detectable from an analysis of the message and the digital signature. In one well known embodiment, decryption of the message is accomplished by using the public key (PubK), as is well known.

Figure 2:
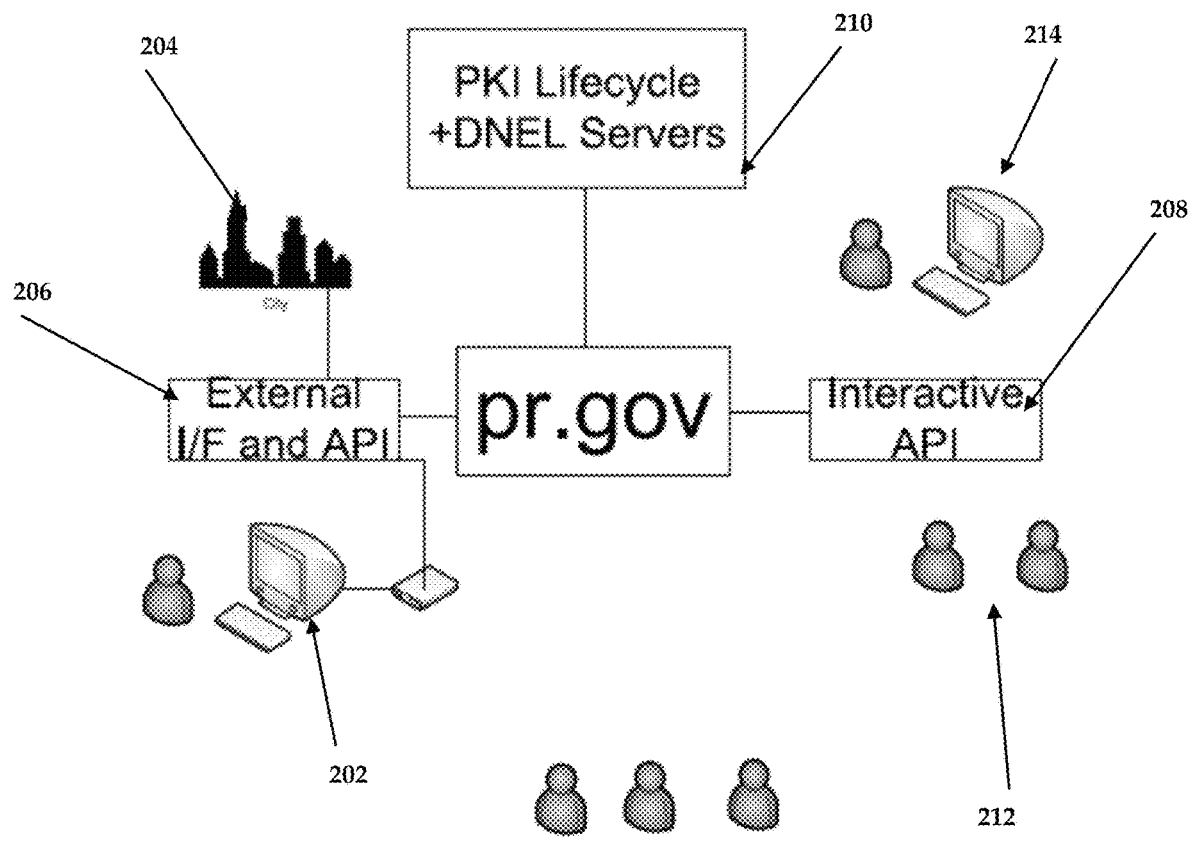
FIG. 2 shows an illustration of the various potential users of the system and method, according to an exemplary embodiment of the invention.

Accomplishing the above security would also include Information Assurance lifecycle including incident management, Custom encryption Key management as well as Symmetric and Asymmetric encryption implementation including Hardware Security Modules. As we see in FIG. 2, in one embodiment a user 202 (be they at home, office, or on the road) or entity 204 would use the external application programming interface or APIs 206 (whether mobile or not), from their computer desktop, mobile platform, tablet, laptop, cell phone to interact with the government portal 208 (in this case pr.gov), where the system backbone 210 would proceed to establish the user's bona-fides, provide digital certification and verification under secure telecommunication conditions (through the appropriate servers/access points), regulatory compliance, integration and security while interacting with the government's or other third party service suppliers (including other government entities).

In some cases, the user would then interact with a human at a corporation or agency #1 212, where there may be an additional civilian, in others with a human or server at corporation or agency #2 214, in both cases through an internal API established within the governmental agency. Through the management of the SecureID management, signature device and/or procedures, as well as the provenance and traceability of each interaction, the user and the government/corporate entity would be guaranteed that the various participants were who they claimed to be.

Figure 3:
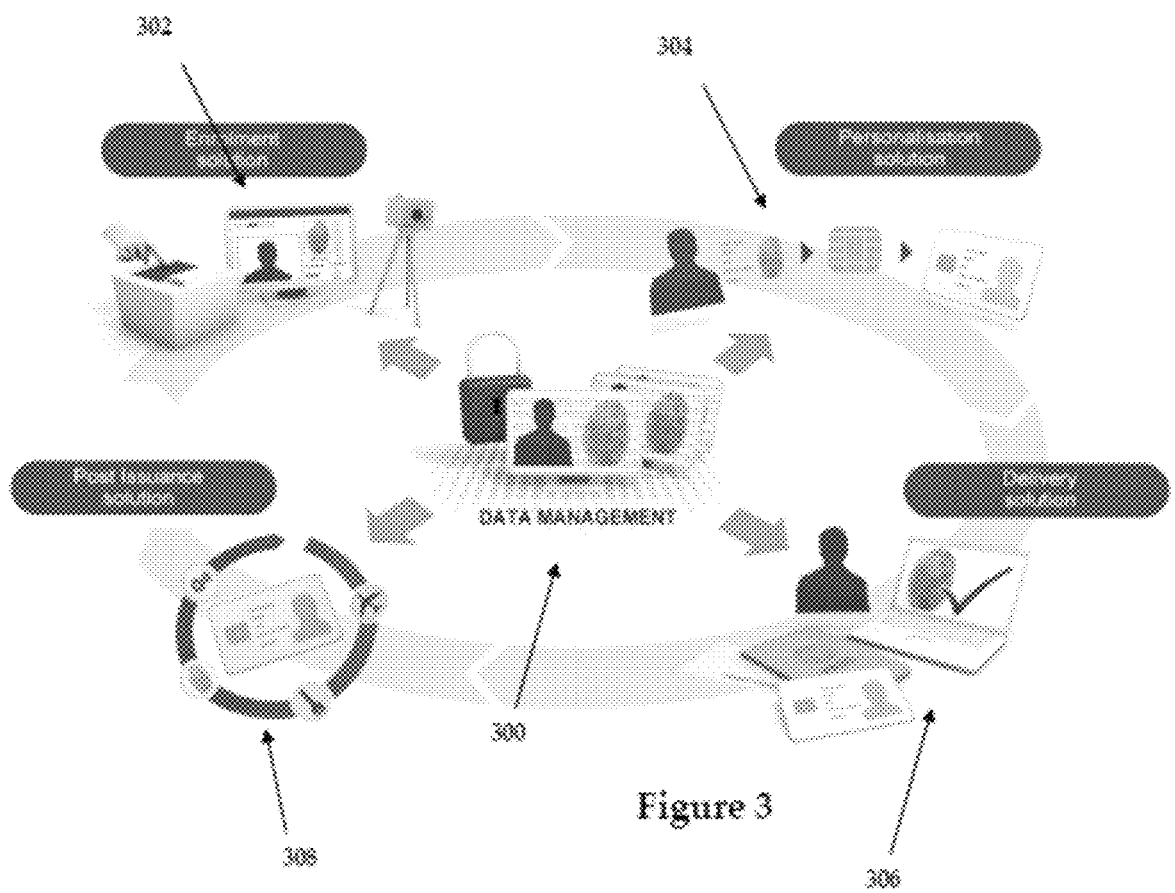
FIG. 3 shows an illustration of a typical user enrollment, according to an exemplary embodiment of the invention.

The above (FIG. 3) is guaranteed because the data management 300 is at all times (Enrollment Solution 302, Personalization Solution 304, Delivery Solution 306 and Post Issuance Solution 308) utilizing SecureID management techniques capable of establishing their bona fides without the possibility of unauthorized duplication or mis-appropriation.

Figure 4:
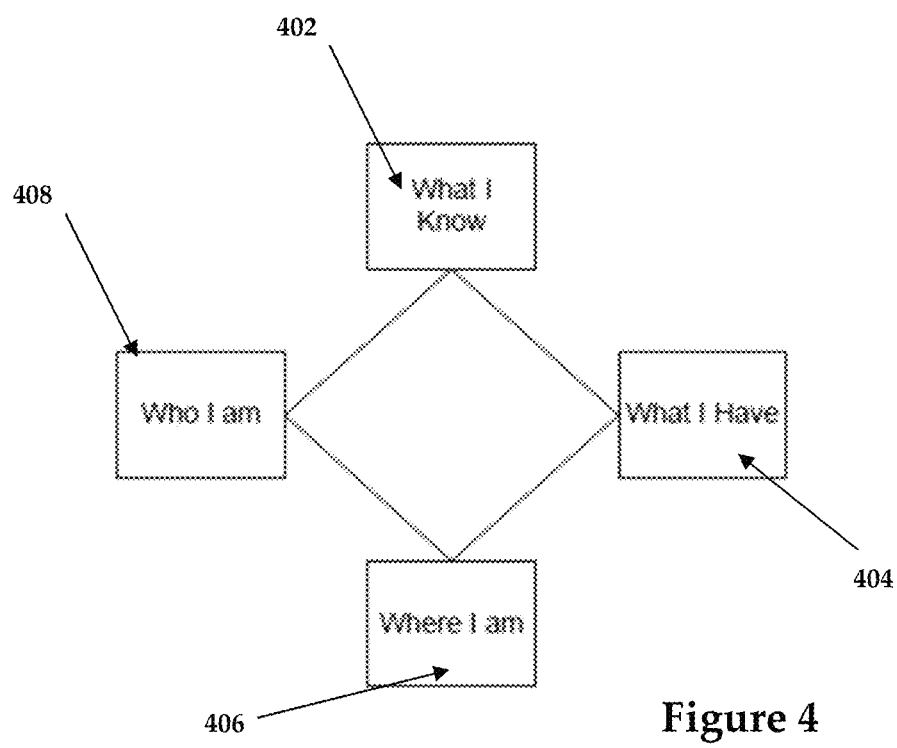
FIG. 4 shows an illustration of the typical Security Diamond, according to an exemplary embodiment of the invention.

The above concepts are based FIG. 4 on an augmented Security Diamond (SD) 400. That is, a SD that is augmented by the geolocation of the digital signatures generated by the system. Recall the SD is a concept wherein to establish someone's identity and bonafides, we must know "What they know" 402, "What they Have" 404, "Where they are" 406 and "Who they are" 408, in a firm and non-doubtable way. The above information is not only require to establish the Bonafides of the users 202, but also of the others (persons as well as entities) attempting to establish the bonafides of others. In contrast to many other solutions, in one embodiment the SD used by the proposed solution, is capable of establishing the geolocation of various 3rd parties by distinct pieces of H/W and/or S/W.

Figure 5:
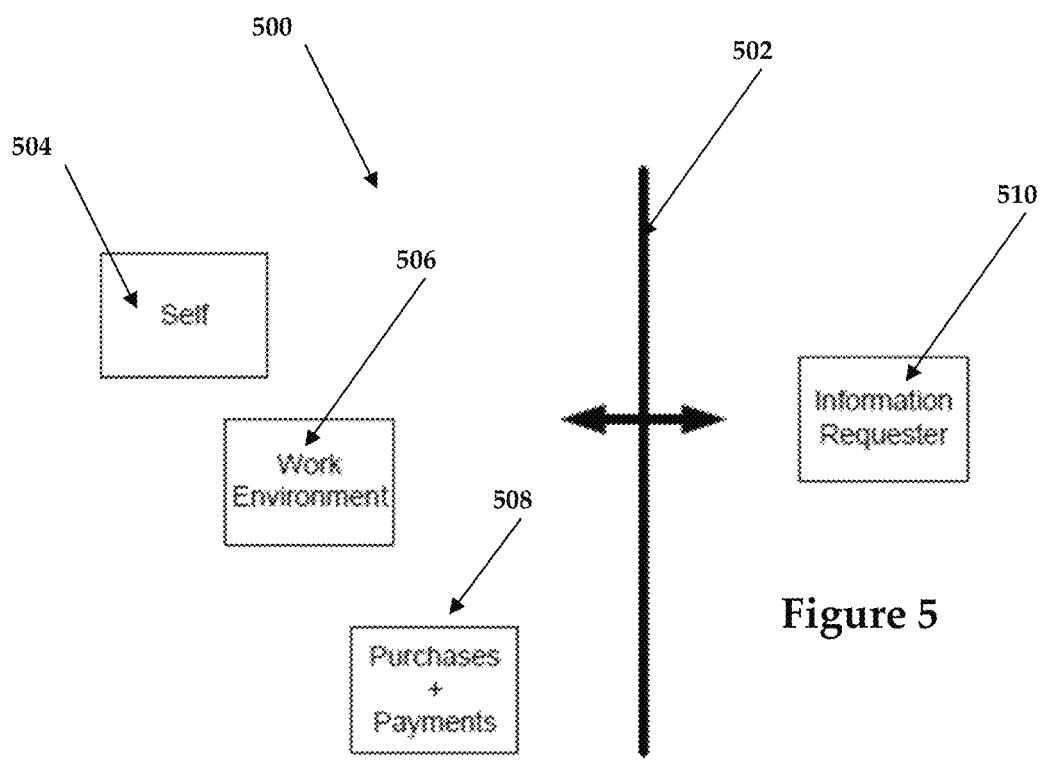
FIG. 5 shows an example DLF transaction, according to an exemplary embodiment of the invention.

By establishing these bonafides about all participants, FIG. 5, when someone 510 (say a potential employer) is trying to access information about someone, in crossing a firewall or barrier 502 we utilize all or parts of a digital signature to access information about a user's 202 actual information (about themselves 504), about their work environment 506 (in this case their diploma or transcript) and/or their purchases and/or payments 508. This framework is in the digital space, hence the DLF concept.

Today, because of legacy systems, we often need to print a physical representation for legacy legality of transactions. However, as the world converts to one of digital media, and more and more of our life becomes digital, the need to sign and approve those same transactions need to occur in a digital form, yet maintain the same proof and integrity as our physical life. In essence, your DLF contains/tracks/signs/verifies the levels of digital information you share, based on the DLF operating across various applications. A DLF creates an information vault that controls what information is shared, based on the level of trust. In effect, the Digital Life Framework acts as a personal safety vault where we keep the things that belong to us, in the digital world. These things include information about you, your family/friends/life and the other extensions of your life. In one embodiment, these include any and all things related to you.

In effect, the framework can then use an Identity Broker or ID managers to manage Digital Signatures (DS) [both yours and of other parties trying to interface with your DLF], and manage interactions about individual information items related to you. The ID Broker is an ID Manager that controls under which conditions you provide access to your information to others. These limits may include 'expiration dates' (beyond which you stop sharing information elements with someone), as well as other conditions.

Figure 6A:
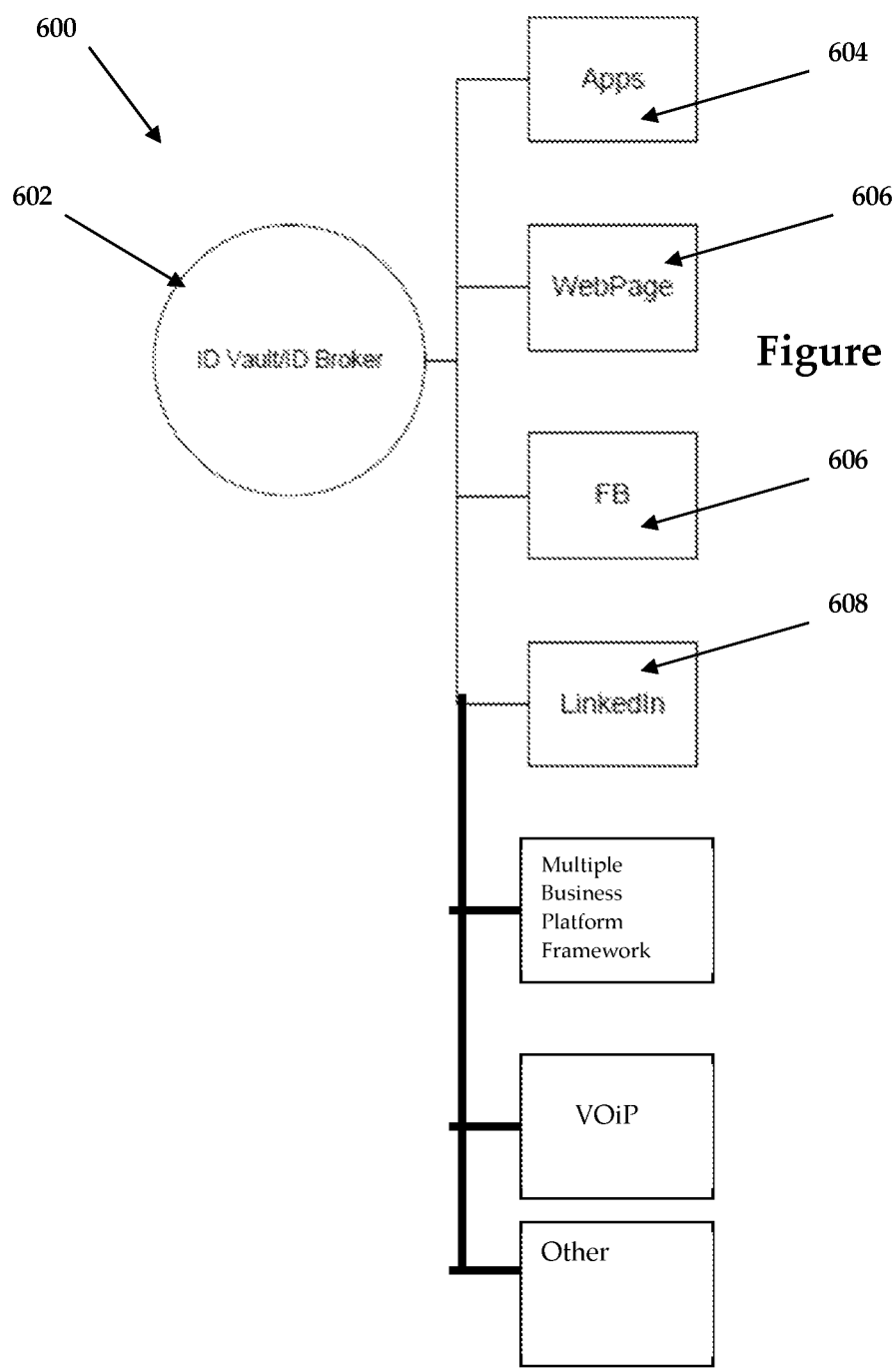
FIGS. 6A-6B show overviews of the Digital Life Framework components, according to exemplary embodiments of the invention.

Imagine FIG. 6A, the ID vault (or ID Broker) 602 interfacing with other apps 604 (such as those developed by other parties), other webpages 606, or larger 'pseudo O/S' applications (such as Facebook 606 and/or LinkedIn 608). These two latter ones are separated, as they are in effect apps within apps.

Figure 6B:
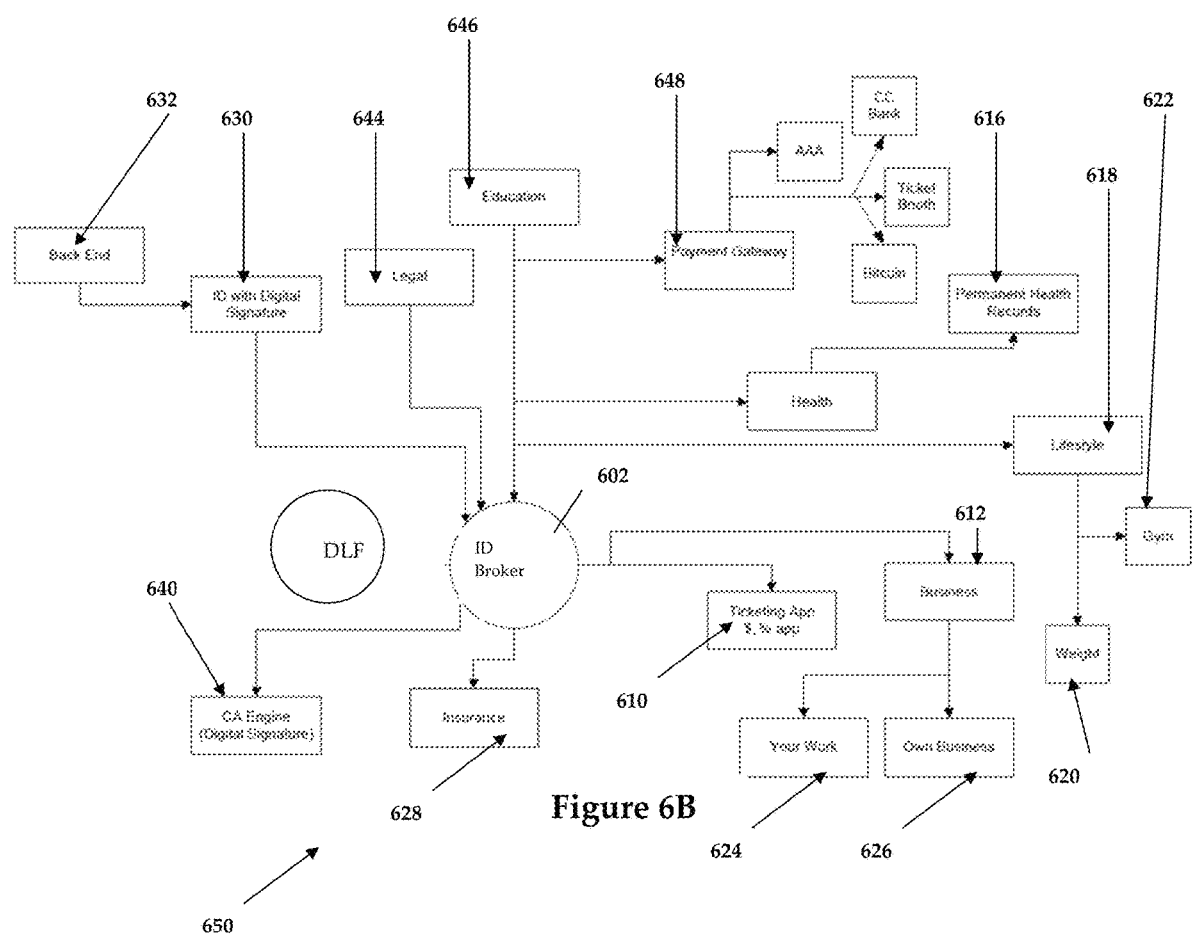

In a data sense FIG. 6B, a DLF 600 is comprised in one embodiment of an ID Broker (IDB) 602 which interfaces with one or more applications/entities with relations to one or more data aspects of a person's digital life. The IDB 602 is who decides with whom to share what information. This information may include one or a combination of various aspects, including; Legal 644, Education 646, Payment 648, specific transactions such as Ticketing 610, Business 612 (including areas specific to your work 624 or your own business 626), Health 614, permanent health records 616 (such as Electronic Medical Records), Lifestyle 618, including weight information 620, as well as Gym attendance 622, insurance 628.

In short, the areas above would represent information specific you, for which access would only be granted when the appropriate bonafides of the accessing agent are established, based on the SD. Imagine for example a potential employers wanting to confirm your academic credentials. That entity would first be validated in checking their DS via your own or a third party (say the CA DS Engine 640, a transaction authorization tables (TAT) and/or the transaction authorization path (TAP)), which the IDB 602 will accomplish by tasking the ID Signature checker 630 at the DFL back end 632.

Figure 7:
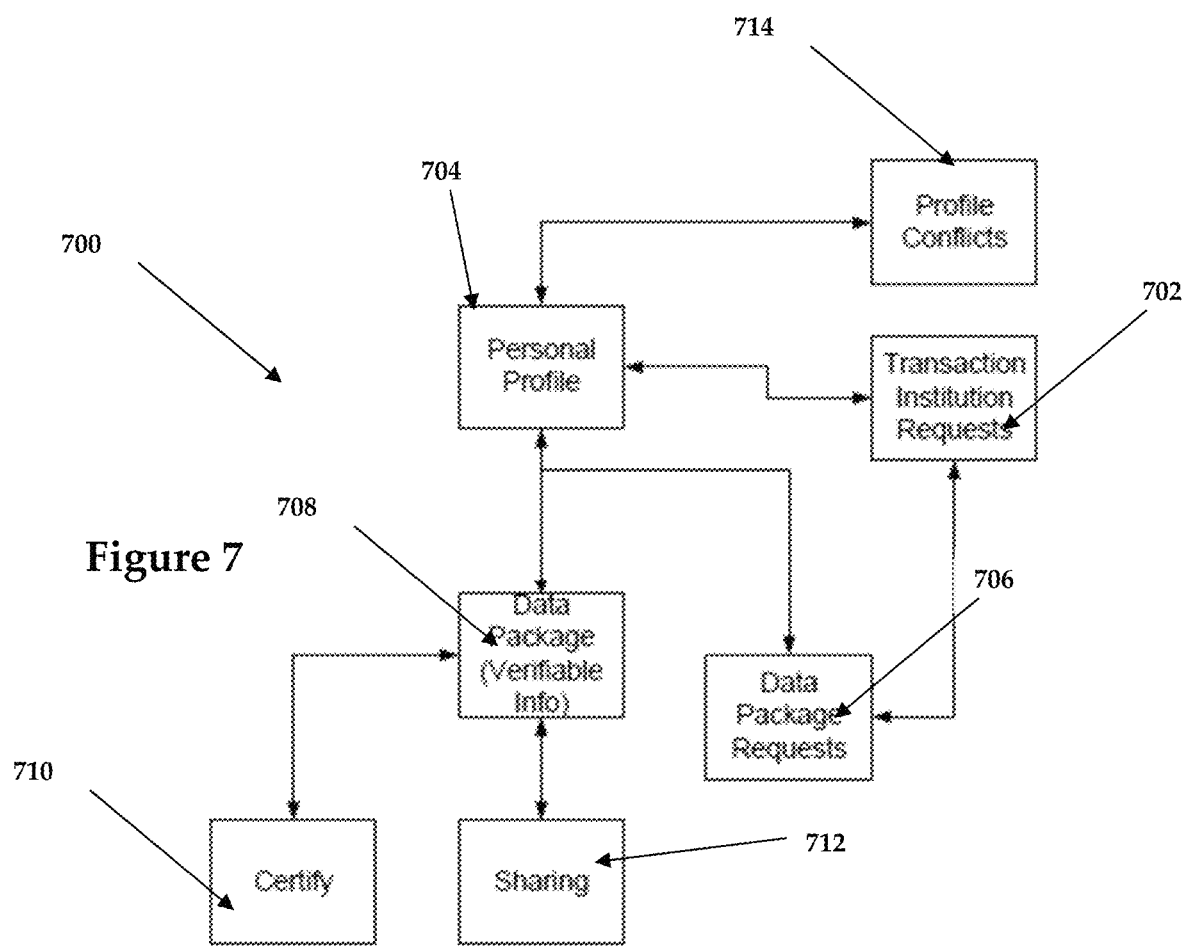
FIG. 7 shows components of a DLF transaction, according to an exemplary embodiment of the invention.

Imagine thus FIG. 7 the transaction in detail 700. The employer interacts by generating a Transaction Institution request 702 (through the DLF) to the Personal Profile 704 using an API/3rd party approach that fulfills the Data Package Requests 706. Such a request goes to the Data Package Verifiable Information 708 routines, which proceeds to Certify 710 the validity of the requesters SD, at which the information is shared 712. Any deviations are handled by a Profile Conflict 714.

Figure 8:
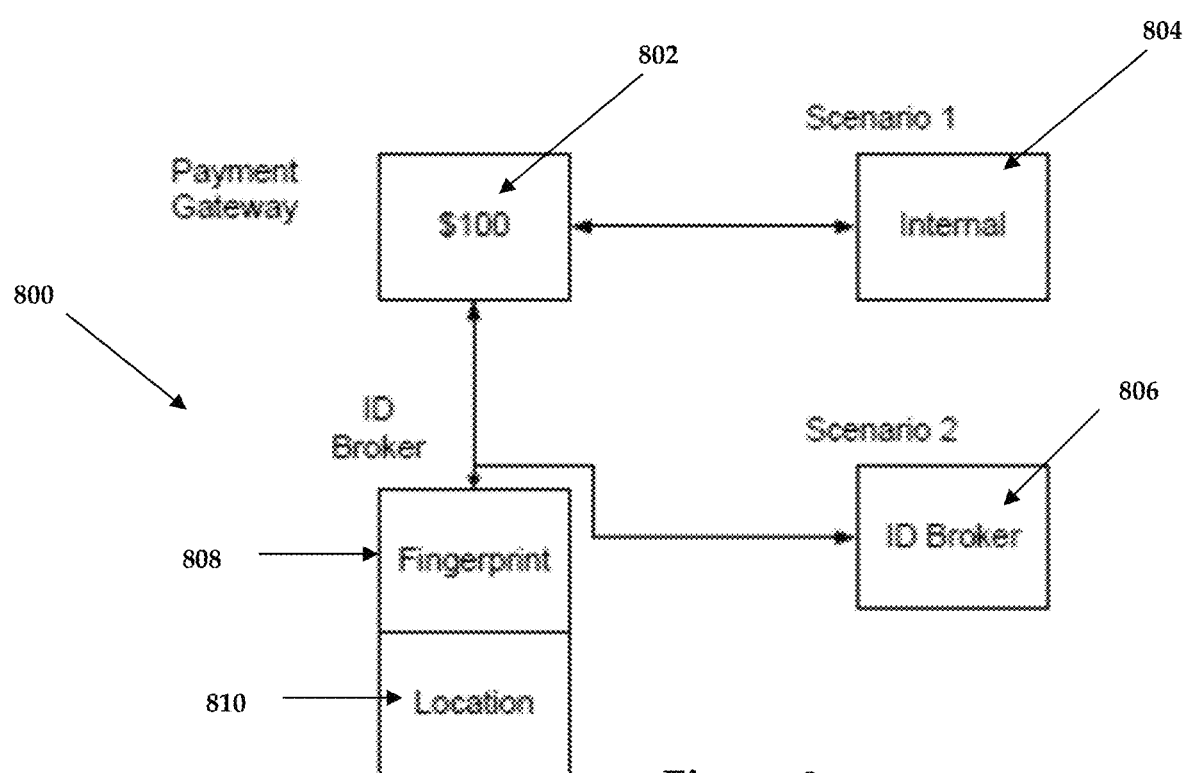
FIGS. 8-9 show examples of a transaction for a typical DLF user, according to exemplary embodiments of the invention.

The above is demonstrated when we see FIG. 8, a financial transaction. A person with a DLF is using her mobile phone to buy something (for $100 dollars) from a vendor (say Amazon) who already has DLF/IDB enabled transactions. Amazon (using the SD) knows the person is really her, that she is a user of the DLF/IDB, that she is at a Starbuck Wi-Fi spot (and the Wi-Fi address), etc. Under one scenario 804, the amount of $100 is below a predetermined threshold, and the payment is handled by the DLF system internally, using either a built in credit within the system and/or access to the payment gateway 608 from the user's approved payment method.

In an alternate scenario 806, the amount payable is above a threshold, and Amazon decides to use their own payment gateway. However, they use the ID Broker 602 to verify the user's identity. The IDB 602 proceeds to confirm the user's identity (who they are 408) by requesting the cell phone's system to take a fingerprint 808 (other options may include a password, bio-identity, One Time Payment, TAT, TAP etc.), that is something that proves beyond reasonable doubt that the user is holding the phone and acknowledging the purchase. Of course, the actual Amazon to the DLF interface is accomplished by a secure portal (such as standard Internet plumbing HTTPS and/or similar or enhanced equivalent protocol).

Depending on the established norms, the IDB 602 proceeds to confirm the user's identity (who they are 408) by requesting the cell phone's system to take a fingerprint 808, and also establishes the location (where are they 406) by asking the Wi-Fi system to verify the location 810 as part of the 'where am I' 406 portion of the SD.

In one embodiment, the Wi-Fi bonafides are established by the system. In an alternate embodiment, the Wi-Fi router bonafides are augmented by the addition of a geolocation unit, secure attached beacon and/or crypto token with secured data storage and protocols). A location aware router unit, guarantees the "Where am I" 406 portion of the SD, because it establishes that the units connected to it are connected to a secure and trusted source that establishes the unit performing any action is located where it says it is located via first and second source geolocation.

Figure 10:
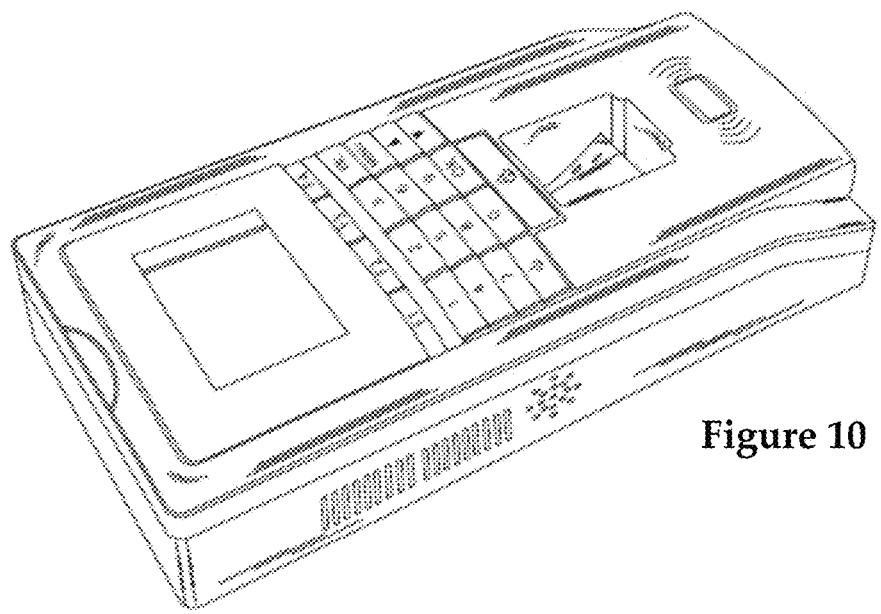
FIGS. 10-11 show examples of Geolocation PAC units, according to exemplary embodiments of the invention.
Figure 11:
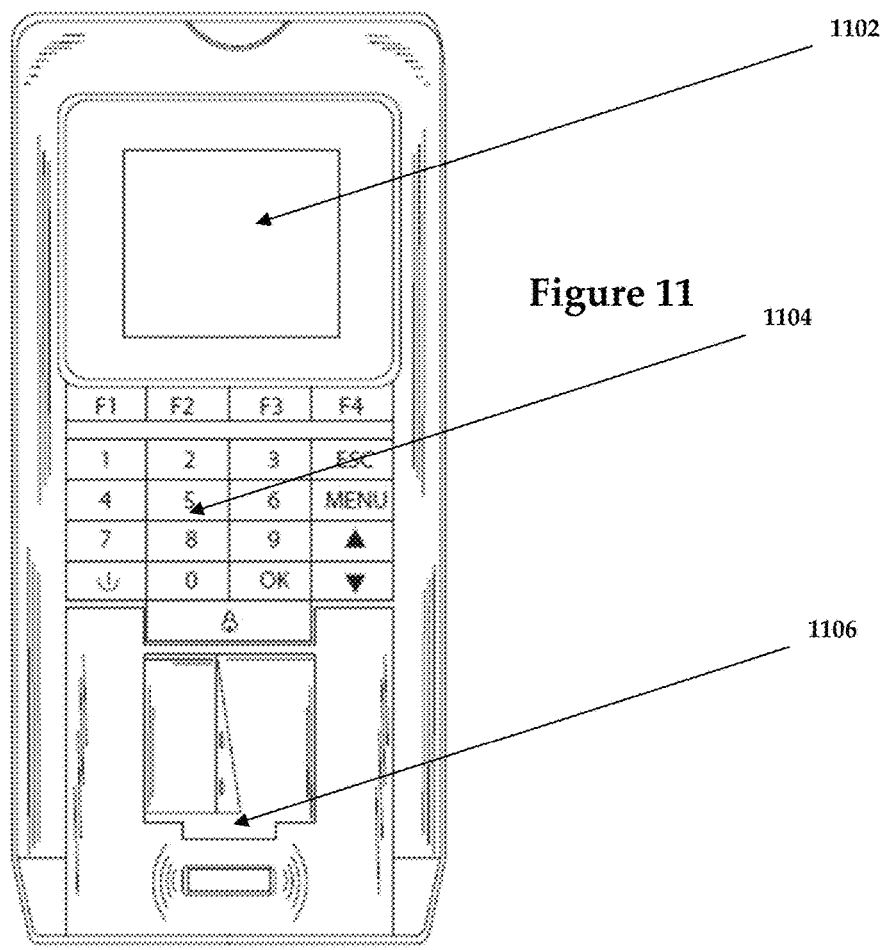
Figure 12:
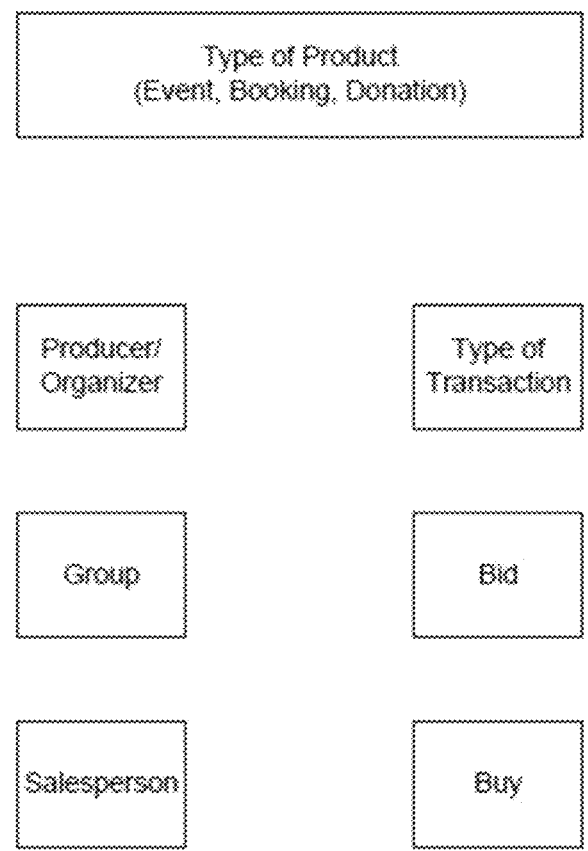
FIG. 12 shows components of a DLF transaction related to tickets for a concert, according to an exemplary embodiment of the invention.

Either the router and/or the computer system connected to it may have additional location security via a Physical Access Control (PAC) unit (FIGS. 10-11) which provide either hardwired or wireless networked connections and allows for the geolocation of the individual performing any validation or DS, which is then recorded within the TAP. Note a similar device may be used to act as a POS+Identity Management terminal. A typical PAC has a CPU processor capable of handling DS, as well as one or more displays 1102, keyboards 1104, fingerprint 1106, RFID or other biometric device and if possible a camera. Thus a phone/tablet/computer connected to a wired/wireless network protected by a router and/or PAC location, has an increased level of security that is reflected on its security rating.

The interactions with the Smartphone/Tablet/Laptop/Computer may be augmented by the introduction of programs running on the browser of said device and/or by the execution of applications within the devices. In one embodiment, the cell phone is a second factor or second level of confirmation of the SD. A first level is the password/fingerprint scan that allows a user to access the phone, as well as the time since the authentication was done. Thus, someone who ten seconds ago confirmed their identity, is much more trustworthy than someone who did 30 minutes ago, especially if nothing happened for the last 20 (phone may have been stolen). Perhaps when a certain threshold is reached ($20), the system asks for re-authentication by the user.

Figure 9:
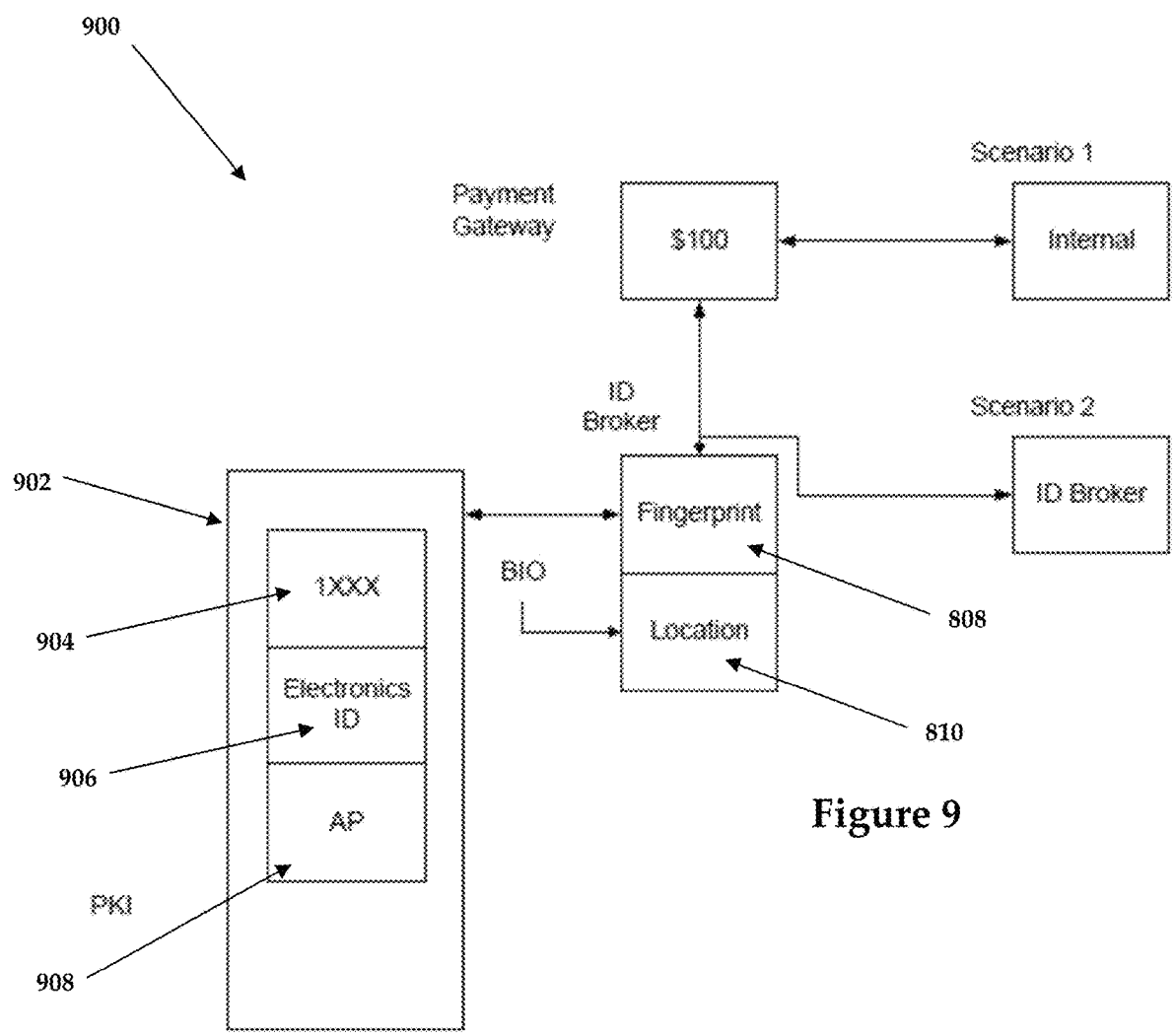

The above can be seen FIG. 9 when the second scenario. In one embodiment 902, an application (or app) 908 (perhaps having a second password or token) activates a special Digital Signature 902 or security mechanism within the phone, which provides you with a one times password (OTP) 904 derived from the electronics ID of the phone 906 (using a hash of the specific processor ID and other unique chip numbers, and/or as an alternate, an offline synchronized crypto routine). In addition. When sent to the DLF server, this OTP comes in with a PKI DS for the phone and the OTP. Again, demonstrating that the person who approved the transaction had access to the phone, and generated an OTP at this time.

In one embodiment, the cell phone re-generates a new OTP password every 30 seconds (or any other programmable time interval), based on the specifics of the user (biometrics, password, etc.), as well as those of the phone electronic (CPU, Flash, SD card, SIM card and/or any other electronic Unique ID), or may have a Token within it, so the PKI keys may be generated with an attachment to the phone.

It may even be a unique non-removable part of the flash. The public key may be shared so 3$^{rd}$ parties may validate the integrity of the messages digitally signed by the phone.

Following the above, we note how now we create a mobile unit that is capable of accepting user input (including password, transaction identity guarantee PKI, bioinformatics (video/facial), password, geolocation, pin), as well as the additional ability to generate a One Time Passwords based on the unit's information.

In effect, the access to the persons DLF is now a personal depository of his/her DLF. When one buy's an iPhone, the product information will be accrued and made available to the person, so that he/she may keep track of all the products purchased. Copies of all transactions will be directly accrued to my records by separate vendors. In one embodiment, the system works as a centralized secured messages transaction server, so that if an arriving transaction/offer/etc. does not arrived with a DS or certification that validates its provenance and/or TAT/TAP, it'll be rejected or sent into a spam folder. So transactions will be either phishing, or they will be valid but incorrect, so that I will reject them.

Anyone buying a product using their device or unit (phone, tablet, PC, laptop or similar computer system), must then be authorized to the DLF by having access to one or more times. A password, a device, a Digital Signature inside the device and access to generating an OTP. When the above is performed at a physical transaction place (say a food truck), your portable device utilizes the SD (augmented with the geolocation of the device and/or beacons with secure communications protocols) to validate that the portable device was at the particular location when the suspected transaction took place.

In an alternate embodiment, the OTP becomes a 'fortified OTP' (FOTP). In effect, an OTP is a scratch pad (something to be disposed after a one time use). But a FOTP would allow adding a PKI encryption to a person's DS. So if you have a previous DS, the OTP is invalid after a certain amount of time has passed (say change the OTP every X seconds). Thus if someone exposes the secret key, it becomes cyclic (so that the key between your OTP and the server is reset daily, or within the amount of time desired).

In one embodiment, the Digital Life Framework (DLF) is comprised of two primary computing processing components, an Identity Broker (IDBroker) and an Information Broker (IB). In effect in the DLF system, the Information Broker received the identity from the IDBroker ID provider. The IDProvider is a computer and communication system that in one embodiment utilizes OPENID Connect protocols (or similar protocols as well as custom protocols) to authenticate a user's ID within a system. As such, the IDBroker or IDProvider is effectively the interface to the Information Broker within the DLF).

In one embodiment, there is an initial enrollment cycle, which may be comprised of one or more of; a background check, information validation, one or more levels of ID credentials creation, generation of ID Card, Token, Password, One Time Password Token (be it hardware or software generated), server accounts (such as Lightweight Directory Access Protocol (LDAP) or such similar authentication serve), etc.

Thus, under the DLF, when such a credential is generated within the ID Broker/Manager, ALL the security keys, cards or devices generated are lined to your Digital ID. Since the DLF platform allows for custom authorization transaction protocols, said protocols may be augmented by Satellite navigation systems (e.g. Global Positioning Service (GPS) or similar), RF Beacons, Relocation, etc, special electronics or biological/biomechanical devices.

One or more filters may be introduced at the interface of the Information Broker and the ID Broker. One of these is a transaction authorization table. Such a TA table is a high level discrimination table that identifies which factors or agents in the transaction must be authenticated and verified. As an example, such a table primarily refers to users or individuals/entities that must authenticate and sign the transaction, the equipment linked to each said user and the type of authentication to be used. Depending on the type of compliance and security required, the encryption keys and handling of the Digital Signatures (DS), the information may be modified, as there may be notification protocols required per event or transaction.

In one embodiment, the biometrics can also be configurable with several levels of security depending on transactions. For example, when fingerprints are used, low security requirements may need only 8 points validated within the fingerprint, whereas high security applications may require 20 points validated.

In addition to the TA table, or as a replacement for it, a Transaction Authorization signed path may also be used. This is a feature through which every step of the transaction path is defined (as a level of security required per device, location, etc.) for every device throughout the path in order for the transaction to be considered valid. In one embodiment, every device specified along said path would have a security deviation tolerance that would depend on the desired transaction security. As such, it may be that every device on the path requires geolocation validation, or a user's biometric input (as opposed to passwords), etc.

The InfBroker thus uses the IDBroker plus an Identity Manager to determine a party's access to the DLF. When the user requesting access is authenticated and authorized properly, they obtain access to the information within their DLF, so they may navigate their profile and access their information (and modify any items that may be modifiable by the user).

One of the pieces of information they may modify, is the addition or removal of "allowances", that is, what individual or collective information about the user may be available to other users that are authorized/validated DLF users. For example, a user that has finished a college course or certification may thus broaden the "allowance" to their Vitae to those having elements identifying them as potential employers, government certification agencies or other similar users. In one embodiment, these "allowances" may be as simple as those used in the HTTP protocol (i.e. Put, Get, Post, Delete).

Within these "allowances", there is a NOT permit, which allows a User to place exceptions to access within their DLF profile. As an example, imagine a user who desires to give complete access to a folder having their complete Medical Records, except for Data about their mental health. In such an example, a User of the DLF would provide an "allowance" to all Medical records folder, but place a "NOT" allowance to those specific to their mental records.

As can be seen, the above is a very powerful weapon with regards to personal information management. By attaching to each of these "allowances" or permits the IDBroker and InfBrokers (that is, not only the exchange of cryptographic keys and signatures, but also the information about each step in the path of authentication), each path folder or document may have the various levels of crypto keys to increase their security. Thus an optional Key management module which handles said keys increases overall security.

Thus, each allowance may be conditioned with additional security filters and/or business rules. As an example, the transaction date may have a timestamp field which includes checking any deviations of when the transaction was executed. Or a time stamp may be generated by the DLF and signed/verified by a separate server, which adds yet another DS to the transaction. Another basic control field is the amount of times a particular data field has been accessed. Such a filter controls the number of times a particular field has been read or downloaded.

An Auto data destruct filter may be also implemented, so that based on the number of times a field has been read and the transactional date of the data, an auto-destruct routine may be enabled. Multiple Entropy or other data destruction methodologies may be used to destroy and remove from the system certain fields, while creating an audit trail of such destruction that includes who and how the data destruction was performed/originated/commanded.

An additional filter may be related to the provenance of the data. In such a case, we encounter an authorized DLF user who solicits information and has valid clearance to obtain it, but whose geolocation for obtaining the data is not valid. In such a case, interaction with the ID Broker, transaction authorization tables and transaction authorization path would point to the discrepancies in either geolocation and/or device authentication. Such a function would eliminate a lot of phishing/meaconing attacks to the security of the system.

Yet another control filter may be obtained from knowing if the user paid their DLF bill, if their account is up to date, and/or how much is available in funds within the account. Such a feature would allow the protection of both the DLF system administrators, as well as of any $3^{rd}$ parties that may have delegated the payment permit to another party through the system. In this fashion, a user acknowledging a payment gets both a financial or payment status of their account, any kind of special offers based on said status. In one example, imagine your EZPass account is linked to your accounts via your DLF, once the balance in your EZPass account drops below a certain level, you receive a SMS, MMS or email alerting you to the low balance, and once you acknowledge the recharge, EZPass or other $3^{rd}$ parties may use this action to offer you additional discount or services.

Locating an archive within the InfBroker may be accomplished in a number of ways. These include an URL (to locate the document such as docs/label/filename). The tag and label may be used to create a basic unique document ID. A more advanced ID may be generated by using the tag, label, DS and other mechanisms to generate both a unique ID, as well as an easy location of the file.

In embodiment of an Authentication Protocol may be based on the Transaction Authorization Table, Transaction Authorization Path and one or more variables about the user used by the ID Provider. These multi factor authentication (MFA) mechanisms variables may be one or more from the group comprised by; Password, Pincode, One Time Password, Biometrics (including Face, Finger, Iris, Veins, Voice and others), Machine generated unique codes, Machine Digital Signature, Machine Digital Signature on a secured cryptographic device token and/or Machine generated Unique Code on Secure Cryptographic Device token, LDAP, other authentication and/or authorization servers.

Figure 13:
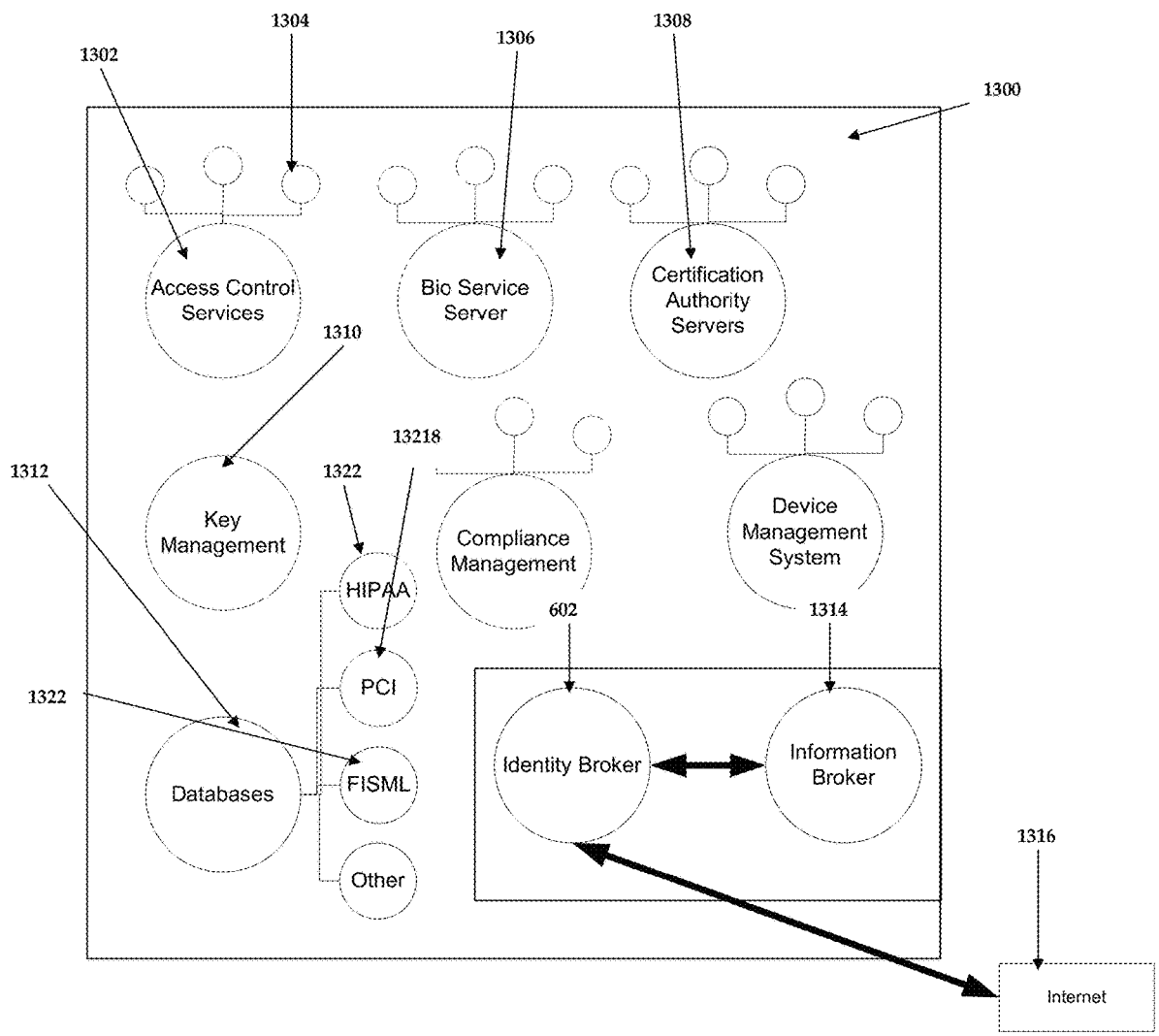
FIG. 13 shows the computing components of a DLF, according to an exemplary embodiment of the invention.

Referring to FIG. 13, we see an embodiment of the Digital Life Framework (DLF) back-bone 1300, which is formed by one or more computing processing components (typically computing servers with associated memory storage 1304 and processors) that perform the functions of Access Control Services 1302, Bio Service servers 1306, Certification Authority Servers 1308, Public/Private Key management services 1310, as well as the other associated databases 1312 (e.g. HIPAA 1322, PCI 1318, FISMA 1320). All these services interact with the Identity Broker 602 and the Information Broker 1314 computing processing elements before crossing going out into the Internet 1316.

Figure 14:
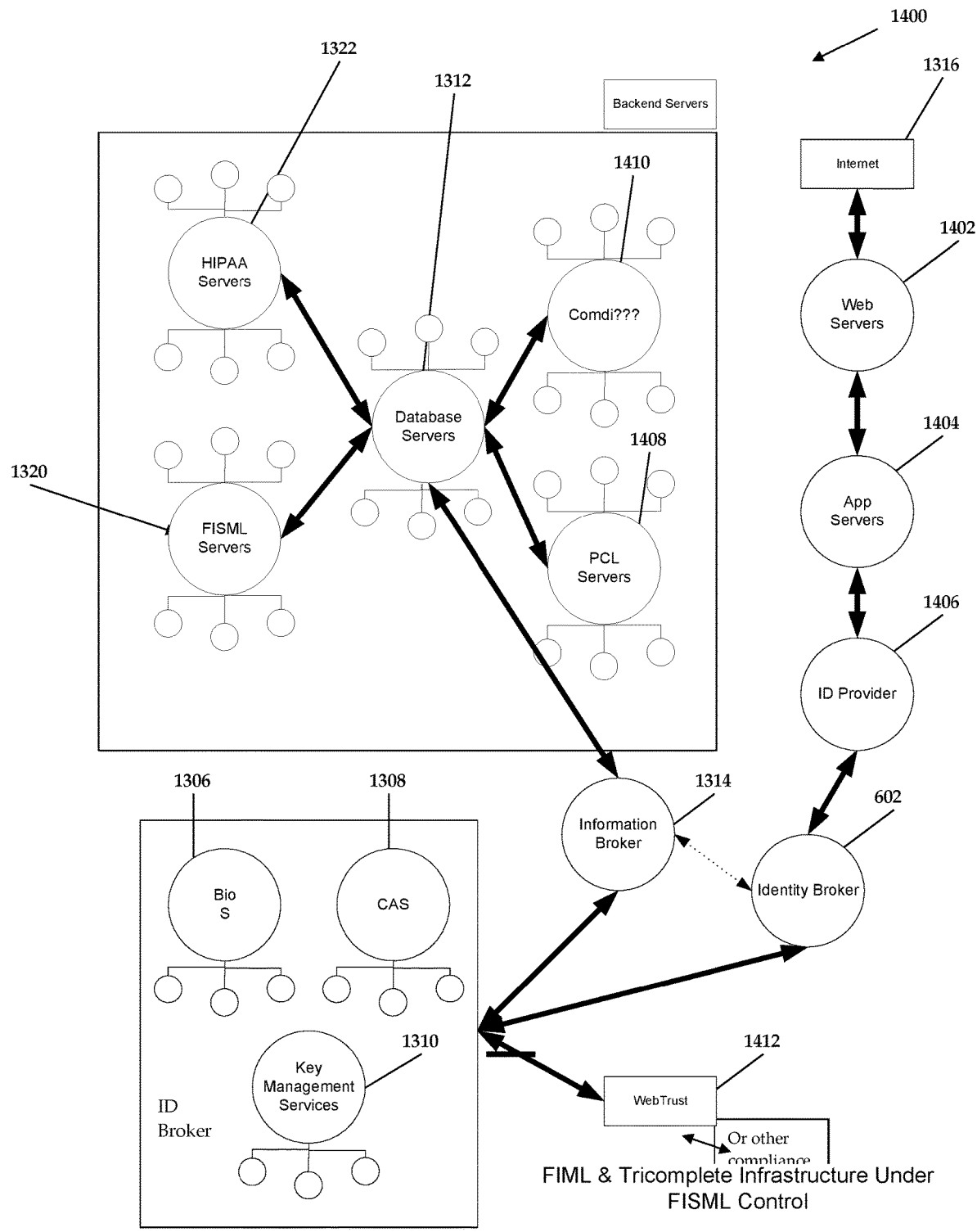
FIG. 14 shows details of the computing components of a DLF back-end, according to an exemplary embodiment of the invention.

The FIML and Tricomplete Infrastructure under FISMA control can be seen in FIG. 14, where we illustrate the flow from the internet 1316 through the various own and $3^{rd}$ party vendors web 1402 and application servers 1404 culminating in the ID Provider 1406 function. The Improviser 1406 interacts with the ID Broker 602, who interacts with the Bio S 1306, CAS 1308 and Public/Private Key Management services 1310 computing processors, as well as with the Information Broker 1314. The IB 1314 also interacts with the ID Broker 602, as well as the Bio S 1306, CAS 1308 and Public/Private Key Management services 1310, in either the TAT or TAP functions. The Webtrust 1412 or similar compliance interaction also interacts with the Bio S 1306, CAS 1308 and Public/Private Key Management services 1310. The Information Broker 1314 interacts with the various databases, which in one embodiment include HIPAA 1322, FISMA 1320, COMDI 1410, PCL 1408 and other associated 1312 servers.

Figure 15:
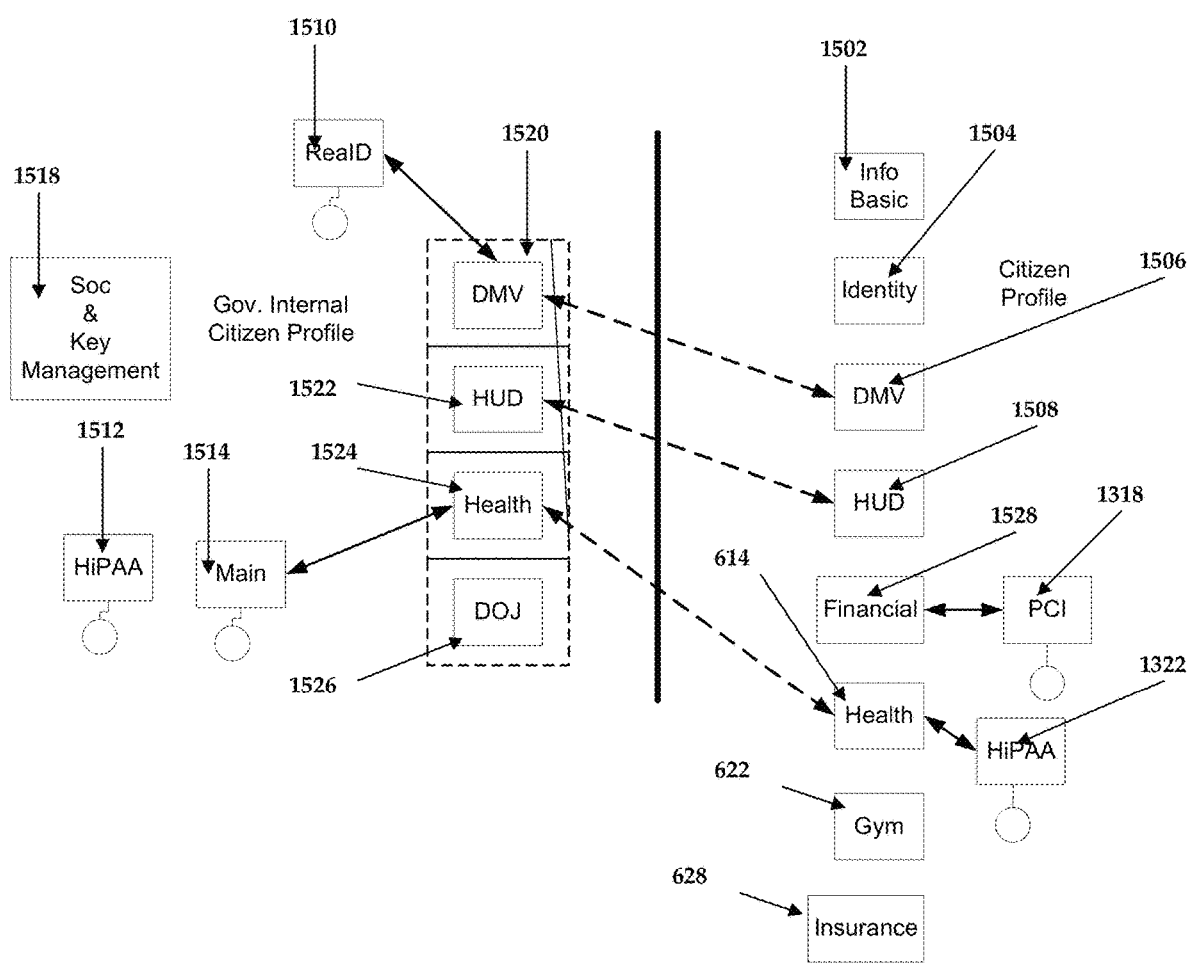
FIG. 15 shows details of the computing components interacting in the case of a user and the government, according to an exemplary embodiment of the invention.

As described before FIG. 15, we illustrate the interactions for a Government services to an individual's or system user DLF elements. In essence, for each individual user there is one or more individual block segment folder, which has an individual's encryption keys that are managed securely based on compliance control needs. The actual data can be distributed among different servers (both actual and virtual servers, where portions of a server tasks are distributed along two or more servers) and/or other secure digital media storage means.

Imagine an exemplary sequence where the user goes to a bank and opens an account. The bank then uses a terminal with secure devices to perform a secure request for information, like Social Security Data, license, name, address, etc. Using TAT and TAP the terminal interacts with the user's DLF, and the transaction is signed, sealed and recorded. The user can then authorize the transaction using the bank's terminal, or their personal mobile secure device (assuming the security levels meet the transaction security policies, similar to the enhanced certification scenario.

Figure 16:
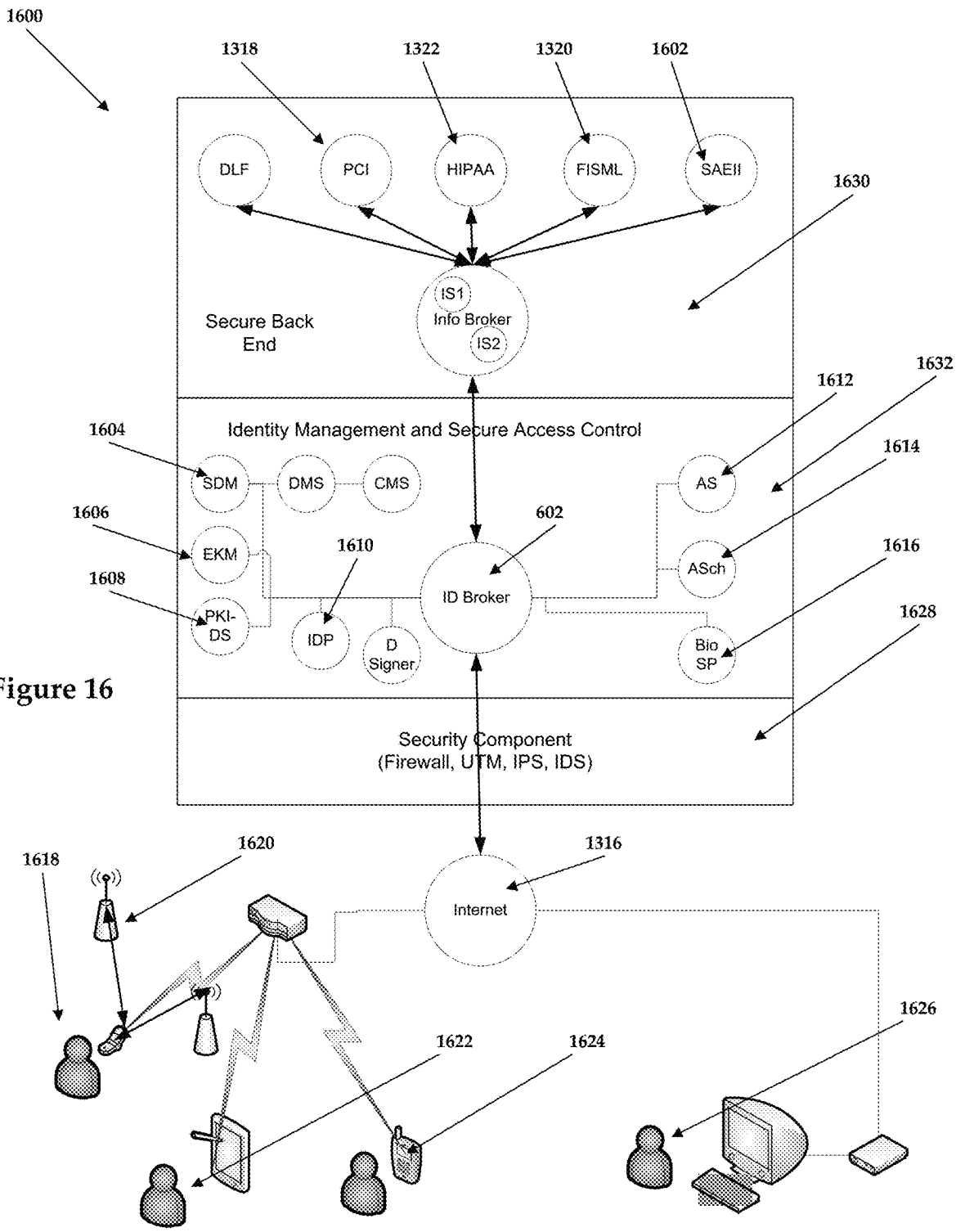
FIG. 16 shows the servers and their interactions in a DLF, according to an exemplary embodiment of the invention.

Referring to FIG. 16, we see how the above would occur with the interaction of one or more servers holding user information related to DLF, PCI 1318, HIPAA 1322, FIMSL (and/or FISMA) 1320 and SAEII 1602 via transactions in the back end 1630 through the information broker 1314. Identity Management and Secure Access Control 1632 would be accomplished by similar one or more computing resources executing the various functions, including; Secure Devices Management 1604, Encryption Key Management 1606, PKI-DISSIG providers 1608 (in one embodiment including an enhanced Certification authority and/or broker authorization server, Authentication Server 1612, ID Provider 1610, Authorization Scheduler 1614, Biosecurity provider 1616.

Interactions with the internet 1316 would be regulated by traditional and enhanced Security Components 1628, including Firewall, UTM, IPS and IDS. Of course, the users 1620, 1622, 1624, 1626. Some users, such as user 1620, may use augmented security devices 1618, operating through one or more beacon augmented locations and/or links 1620.

Figure 17:
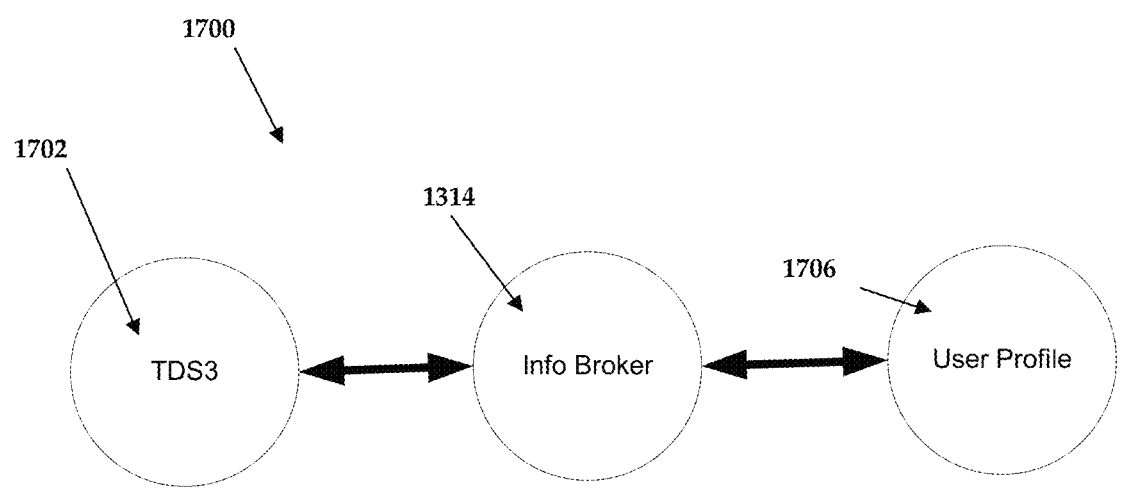
FIG. 17 shows details of the third party ($3^{rd}$) interaction for the Brokers and the DLF, according to an exemplary embodiment of the invention.

As seen in FIG. 17, third party suppliers 1702 may interact separately with the information broker 1314 in accessing the user profile 1706.

An example of the above is illustrated when we imagine a user connected to their Personal Computer (PC) 202. Using a service such as OPENIDConnect, their web-browser allows them to use standard commands to log into the DLF. Once OPENIDConnect receives the transaction, the DLF service provider through the OPENID platform has control to require any other authentication and/or authorization mechanism variables from those identifies above. Once the appropriate level authentication is established, the user is provided authentication and authorization to the system files.

In cases where biometrics are required, then any and all such mechanisms are accepted, except for the password or pin code option. Such an application within the user PC (or Tablet, Smartphone, Laptop or other suitable computing platform) may be enhanced by the addition of an application program (or App), or through the addition of any other program/browser extension which provides physical computer access. For the web transaction example above, let's imagine the user has previously registered with the DLF and has valid credentials.

As an example, the steps involved include;

1. Configuring the DLF back-end computing processing devices with the appropriate permissions.

2. Configuring the DLF computing server devices controlling the web-page second factor services with the appropriate permissions.

3. Loading the DLF computing processing server devices and registering the client within the device that must be authenticated (e.g. PC, Smartphone, Tablet, Laptop, Special Transaction equipment, Beacon, etc.)

Once the above is done, and the user wants to enter the DLF computing processing server devices hosting the website, the process comprises;

4. The user attempting to enter the secure website hosted within the DLF computing processing servers.

5. The DLF computing processing server devices execute the appropriate security rules and lets the user know the authentication mechanism variables required.

6. Once the user is properly authenticated via the required authentication mechanism variable, the user is allowed access to the system.

7. The DLF system processing component proceeds to establish or request additional authentication mechanism variable depending on the level desired.

As one example, a user checking general data may be allowed to enter based on a Password. However, if they decide to access Medical Records, a fingerprint scanner biometric input is required. Once the biometric level is required, the DLF system may augment the Transaction Authorization Table and the Transaction Authorization Path by obtaining the PC digital signature (including its geolocation data and the path of authentication if available), thus informing the user. In addition, an authentication application within the PC may be accessed to perform this step. In another embodiment, the user may be required to use a second device app (say a Smartphone) to establish their bonafides.

An exemplary transaction signing protocol is;

1. The DLF computing processing devices are initialized with a root key and the appropriate PKI signatures, through one or more of the following signature sources; server, application or user.

2. The DLF computing processing device server is authenticated via server or application that will execute within it to use the service.

3. An authenticated transaction is received in the DLF server and app.

4. The IDBroker and InfBroker computer components are used to receive verify and establish if the type of DS received is appropriate to the data, so the transaction may be signed.

5. The transaction is signed with the appropriate DS.

6. The signed transaction is sent to the user who requested it, and a copy of the transaction is kept for audit purposes.

An exemplary Document signing transaction protocol may be accomplished via either hardware or software computer components. If H/W, the PKI keys are generated in the device performing the signing. When the user wants to sign, the operating system or application knows that the keys are physically in the device memory. Alternatively, if there is a cryptographic device provider and the approved authentication methods configured have access to the keys, the physical device may calculate the digital signature and the information is then signed.

If the computing means want to perform a software digital signing, a process of credentialing (credentials generation) regulates the PKI generation, either within the DLF computing processing devices or in other computer resources. Within the DLF, said generation of the PKI may be done by an application at the user's device (PC, Smartphone, tablet, laptop, etc.), or within the DLF computing resources after the login to the DLF servers has been accomplished, including all appropriate authentications.

Once a user is within the DLF system, the user determines what documents to sign and how. In one embodiment the signature may be opaque (such as with the P7S or equivalent format where the DS is actually in a separate archive that is compared to), or impregnated, in which case the DS is part of a document's metadata (such as done in an Adobe or MS Word document). In one embodiment, the user selects the type of signature (from the two above) and/or any other additional feature (e.g. timestamp), and signs the document. Specific DS authentication and transaction rules come into play, and a copy of the transaction particulars are stored by the system. Of course, the signed document may then be shared through the DLF with others, via file locations, secure messaging or other digital means such as email.

Another DS method may be one performed by proxy. A person that wants to sign a document (say from their Smartphone or cellular), but has limited ability to read the complete document (say they cannot fully download it), may decide to DS using the biometric or other interface from the Smartphone and the DS present in the DLF computing servers, as long as the transaction authorization tables and/or transaction authorization path protocols are followed. The above may also occur if the Smartphone has a DS (in either H/W or S/W).

When using the proxy method, the DLF computing server having the document calculates a unique mathematical hash or DS of the document to be signed. The document is then signed with the Smartphone application DS and another from the DLF server. The DLF server then sends a request for DS authorization of the document, including in the request the information about what document is being signed, the DS to be used and the policies to be used once the document is DS.

Once the user receives said information on their Smartphone or device, they authorize the proxy DS and this authorization is signed by the user's device at the point where the transaction is being performed (via Geolocation), as well as their DS through the transaction authorization tables (TAT) and/or the transaction authorization path (TAP).

In yet another protocol, a Beacon Authentication may be used to establish the DS. In this embodiment, we utilize the existence of one or more RF beacons that have been installed and registered in specific areas (say an office building or shopping mall, with one or more beacons per store). The mobile device (Smartphone, cell, tablet, laptop, phablet) has an app or physical interface capable of interacting with said RF beacons.

The App within the mobile device can interact with the beacons, establishing the uniqueness of each beacon through a unique identification (say a number that may be validated) so that the RF beacon may be established and their DS trusted.

When identifying the geolocation based on the input from multiple beacons, the App or auxiliary device linked to the mobile device sequentially captures and updates the identity of the various beacons around it, receiving their ID and timestamp. When a transaction needs to be executed (say the purchase of an item at the store), the identity and location of the various beacons encountered during an X amount of time is corroborated and correlated. Thus, at the time of the transaction (purchase, DS, authorization), the number and position of the beacons within range is communicated and/or the beacons registration log in an X amount of time. Their location, existence, values, may then be used to authenticate the geolocation of the mobile device.

In the case of fortified beacons (that is, those beacons capable of emitting a signal and receive multiple signals including Satellite Navigation signals, DS, and other cryptographic security features), the communication and tracking function is even stronger, as it can create a beacons map that is synchronized with the DLF security services, TAT, TAP, PAC, etc. If the beacon system is tied to security cameras and microphones, the camera view may be pre-configured towards the location of the beacon at a time identical to the transaction, so that a reference of the transaction may be store via visual imagery or audio recordings (perhaps even biometrics derived from the sensors) in order to verify the transaction.

The fortified enhanced certification authority protocol corrects several issues/shortcomings experienced by the CAS. CAS suffers, among others from; extensive background checks that can be manipulated; once certification is given, information is not re-verified and/or updated; the nature of a digital certificate is to provide for user a digital certificate that contains information that can be verified by the CAS. This certificate contains the PubK (Public key of the user and all of this is digitally signed by the CAS, under its "Certification Authority Role". As an example, a typical digital signature certificate contains Common Name, Title, Address, Email Organization, Organization Unit; Country, State, Public Key, etc.

That is, a typical CA does not keep track of who got a copy of the certificate. With the verified information of the user which in many cases is information (name, etc.) that can be considered confidential and could be used for identity theft. The CA does not have the capacity to certify the user information per transaction in which the signature is used. For the CA to update the information in the certificate, it needs to revoke the certificate and emit a new one, a time and resource consuming process.

In contrast, the proposed Fortified Enhanced Certification Authority Broker (FECAB) offers a solution through the creation of a CA that can guarantee multiple types of transactions related to the CA and exchange of any information certified by the CA. The user would have multiple certificates with different purposes and/or different information in them. Proxy certificates with minimum user information would be created for digitally signing or encrypting information requests.

By adding the security controls of the IDBroker 602, the CA can implement the TAT and TAP protocols as well as other custom protocols for the operation of the CA, the key management and all lifecycle management of the data. Adding some functionality that are not being implemented under present procedures.

The Dynamic Certificate Protocol would use the following;

1. Proxy certificates are used to validate the request of information or request for use high grade certificates.

2. Once the request is received, authenticated and authorized, the CA engine communicates with IDBroker 602 and Information Broker 1314 to verify any update to the information of the certificate.

3. If the information is correct, the transaction is authorized with the requested high grade certificate.

4. If the information is updated, the previous certificate is revoked and a new one issued, notifying the TAT and the TAP.

In addition, the user has the capacity to have a transaction certificate of the protocol. In such a case, the user follows the same request protocol or similar one using the proxy certificate in connection to the TAT and TAP (if necessary).

Once authorized, the user receives a specific certificate that is valid for that specific transaction or similar transactions. After the transaction is finished, it is in effect a digitally signed contract. In one embodiment of the protocol, the document/contract is in then digitally signed the DLF timestamp server. In a similar embodiment, the document is signed using MFA.

A log of the transactions and timestamps may be generated once the transaction is finished and recorded, so the user has the ability automatically revoke the certificates without invalidating the signature. This, because at the moment the certificate was used and time stamped with the TAT and/or TAP if necessary the transaction can then be validated. Through the above mechanism, we are in effect creating a unique way to create a different mechanism for digital certificates lifecycle legality and management.

The DLF components may be extended to become a Secure ID Broker with integrated VoIP communication and video conferencing. Voice over IP (VoIP) communication systems suffer from different security issues. In a scenario where both users are using the DLF ID Broker Secure VOIP basic protocol, User one authenticates with the VOIP service using our DLF Secure ID Broker Internally the Broker chooses the appropriate protocols of authentication, authorization and related signatures, encryption keys and notification parameters.

Once all internal processes are completed (this processes and protocols can be custom programmed depending on security needs) the call is sent via an encrypted or non encrypted channel depending once again in the user and security policies. Call recipient user receives notification of a verified call, and a notification of the level of trust and security of the call is presented to user via voice, text, descriptive color, or any desired graphical user interface. The user has the capacity of recording the conversation and use several other security and authentication or business related features while in the conversation real time.

When the call or communication session is terminated, a secured and digitally signed notification message is sent to the information broker and depending on the business and security policies with the attached digitally signed digital format of the conversation. This information can be sent encrypted to the information broker if necessary.

In a similar approach, a Fortified multiple business platform scenario may be executed. Whereas a typical payment gateways are limited to specific transactions and limited mechanism of authentication. Payment gateway are also use only for financial related transactions that communicates via API's or SDK with $3^{rd}$ party integrators that have online e commerce transactions. With a fortified implementation, we would have a unique secure payment gateway with multiple business transaction engine so the user can create an online store with different business models such as: payment gateway, products, services, booking, fundraising, biding, Ticketing for events, pooling, etc. Some of the features include inventory management, virtual currency, reward points management, scheduling and calendar, among others.

By having this framework with predefined business models and combined with the DLF the user with have a capability of creating and managing not only personal but business transaction within the same platform with the highest grade of transaction and authentication security.

Figure 18:
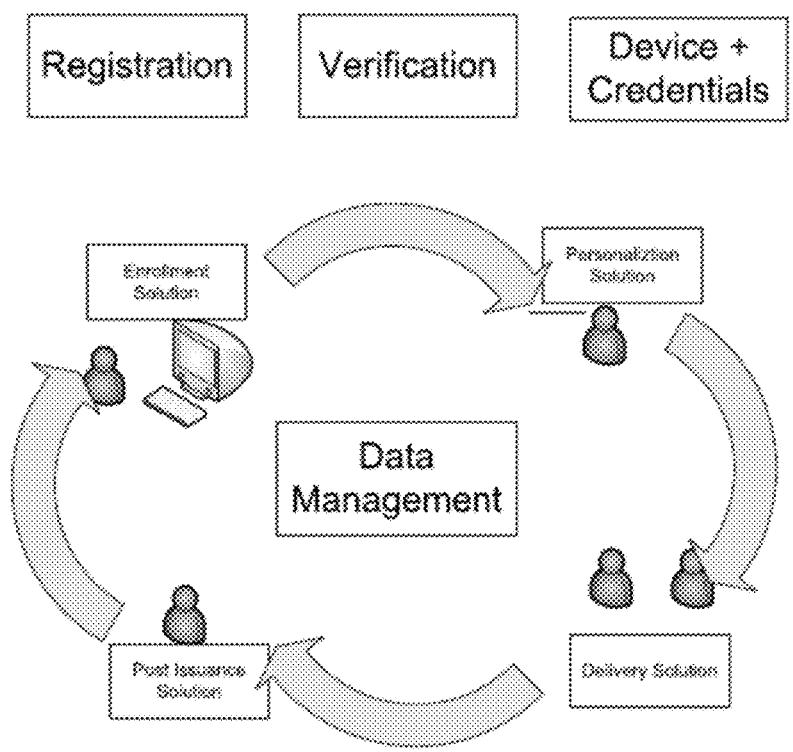
FIG. 18 shows the basic credentialing process, which may change depending on protocols, according to an exemplary embodiment of the invention.
Figure 19:
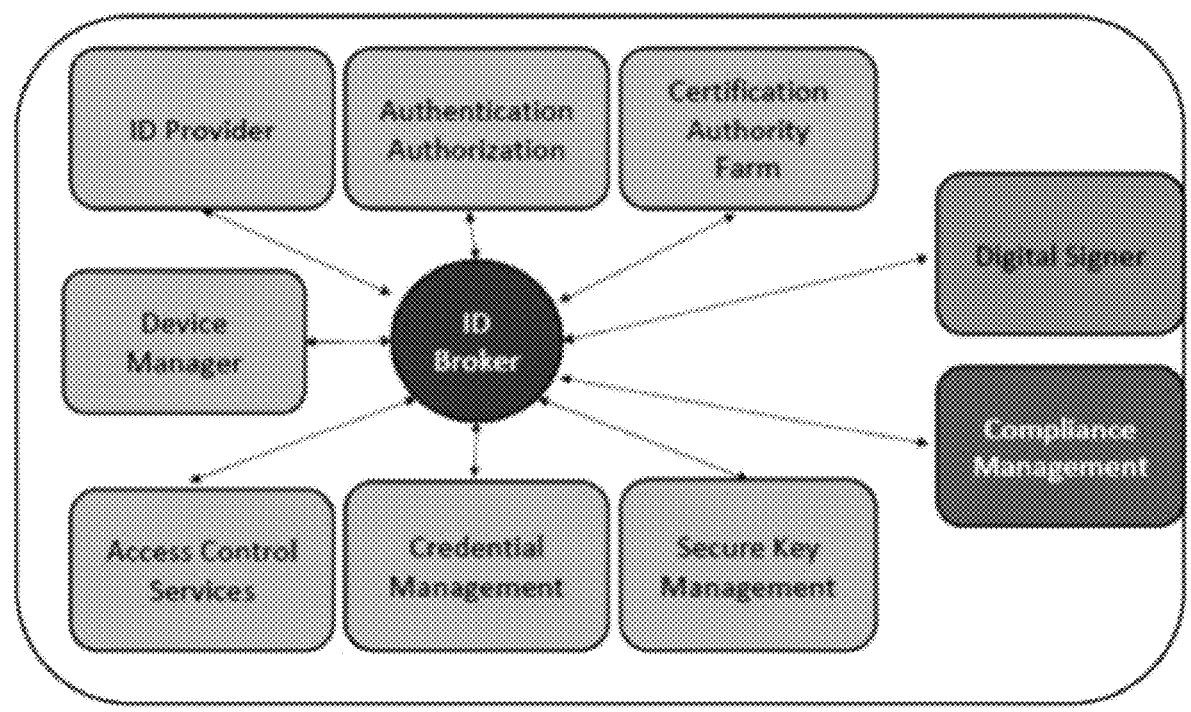
FIG. 19 shows ID Management and ID Broker components, according to an exemplary embodiment of the invention.

Referring to FIG. 18 we see the typical Certificate process. FIG. 19 illustrates the ID broker components, said ID broker a critical component of the Certification authority, including ID Provider, Authorization and other similar listed components. In particular, we note the CAF, which may include two or more Certificate Authorities. FIGS. 20-21 illustrates exemplary components for each of the proposed building blocks. You notice the ID Broker is related to mechanisms and devices to ensure your digital life, with a focus on mechanisms and tools and authentication data to identify the user or individual, not the actual information that wants to be accessed or shared.

Figure 22:
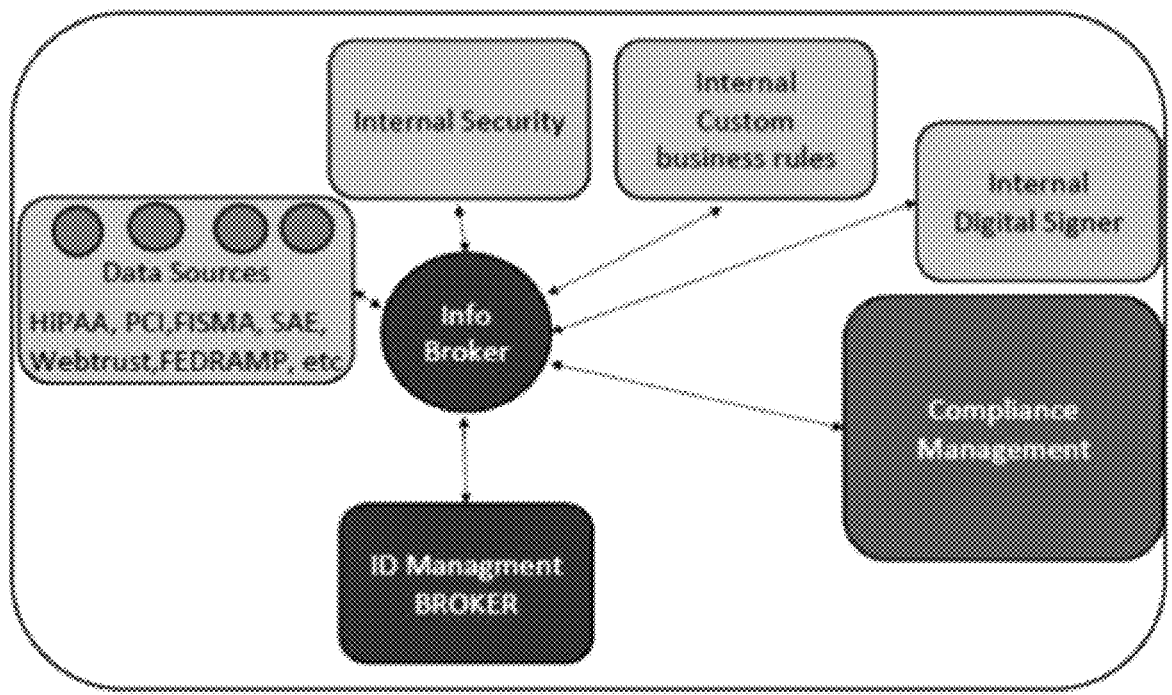
FIG. 22 shows Information (ID) Broker components, according to an exemplary embodiment of the invention.
Figure 23:
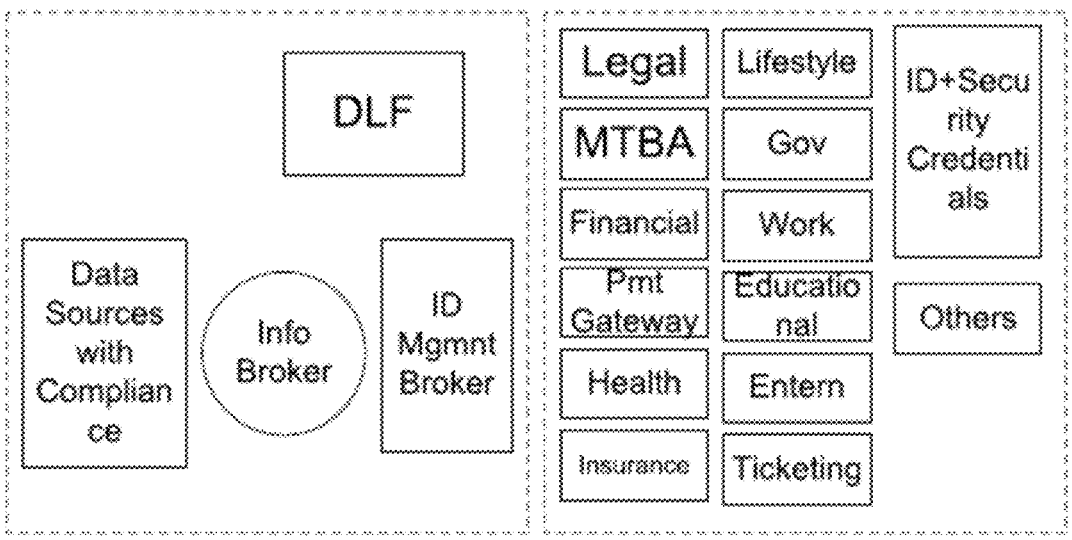
FIG. 23 shows Information (ID) Broker components, according to an exemplary embodiment of the invention.
Figure 24:
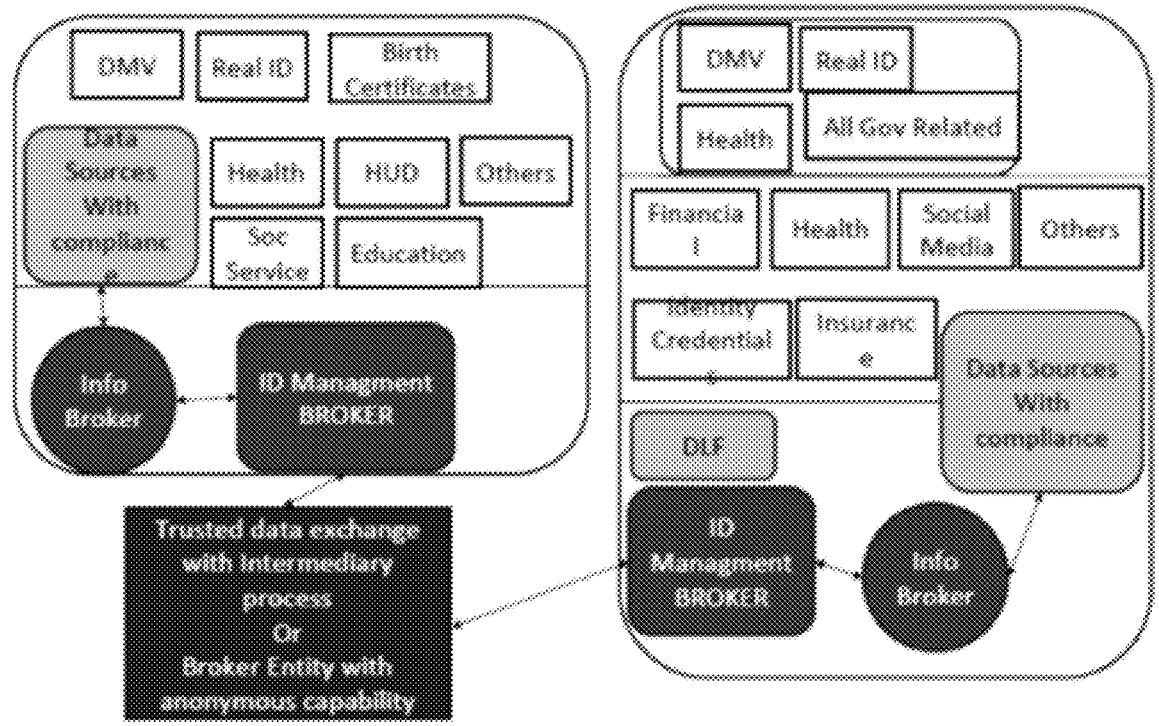
FIG. 24 shows Digital Life Framework Components, according to an exemplary embodiment of the invention.

For example the ID Broker deals with the authenticity of the user requesting a medical record, and once authorized/authenticated, the actual medical data about someone is provided by the Information Broker (FIG. 22). The Information broker has various blocks that communicate with the ID broker, through the DLF (FIG. 23). FIG. 24 shows an example of an interaction between multiple information brokers (e.g. public/government/private entities). As such the Government (left side), may have the same data (or similar), or make anonymous transactions.

Figure 25:
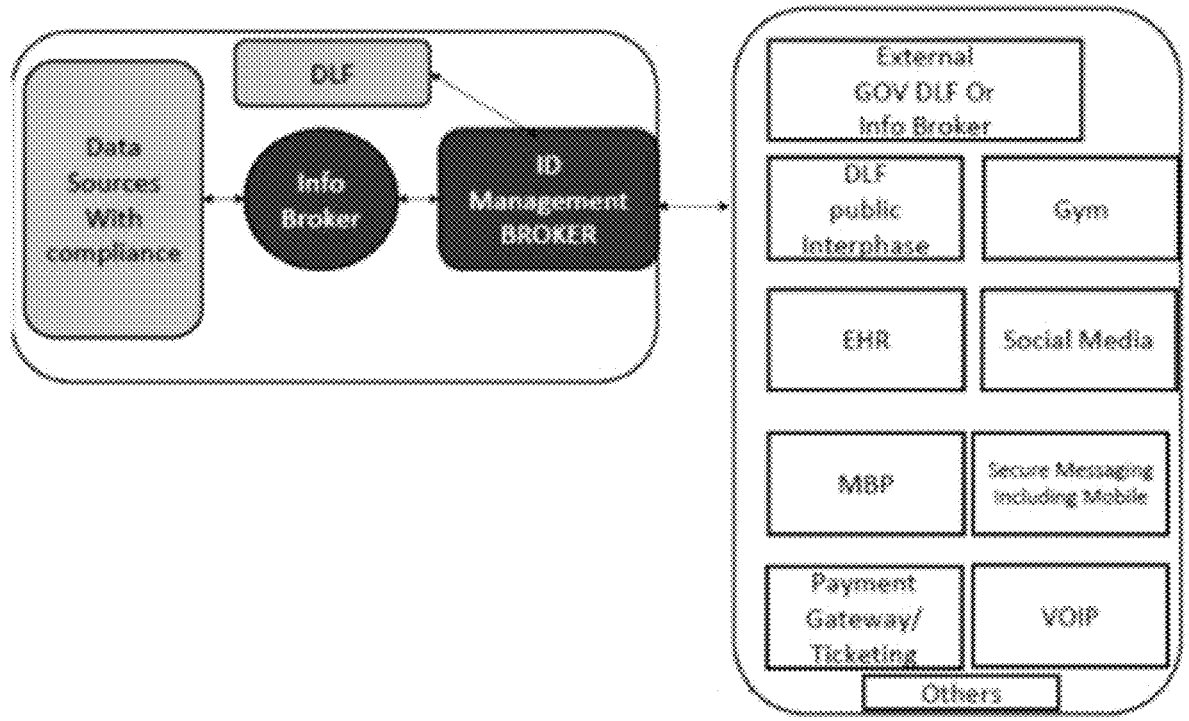
FIG. 25 shows Government and Private Information Brokers, according to an exemplary embodiment of the invention.
Figure 26:
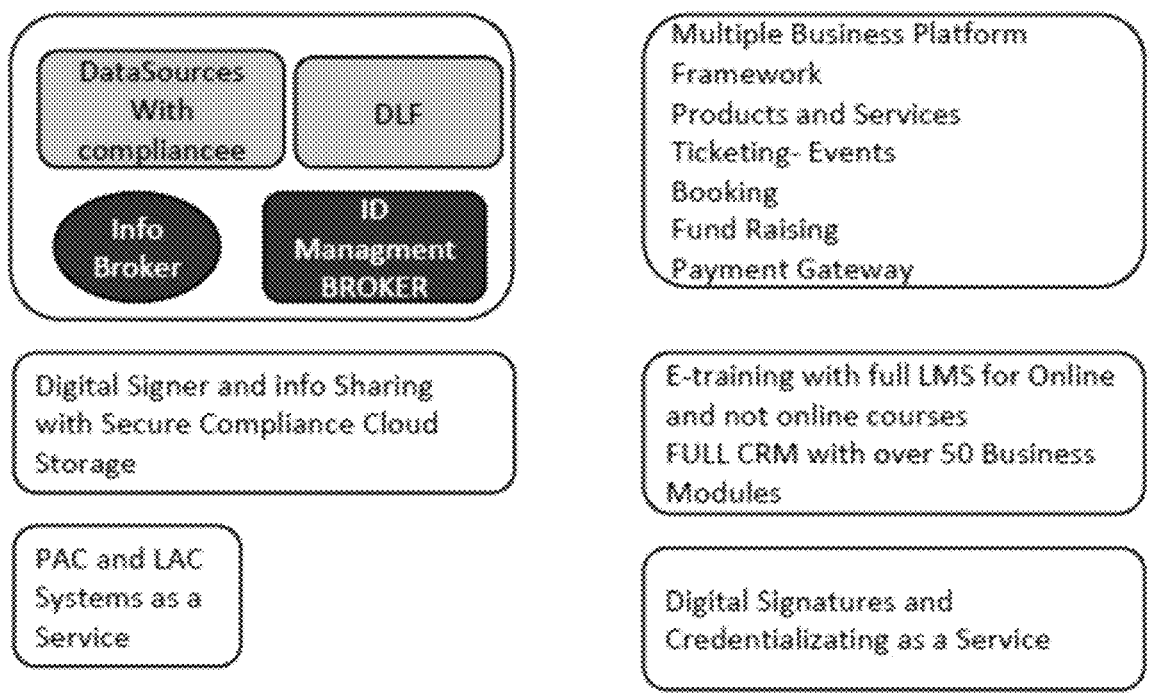
FIG. 26 shows a third party integration with the use of ID Broker example, according to an exemplary embodiment of the invention.
Figure 27:
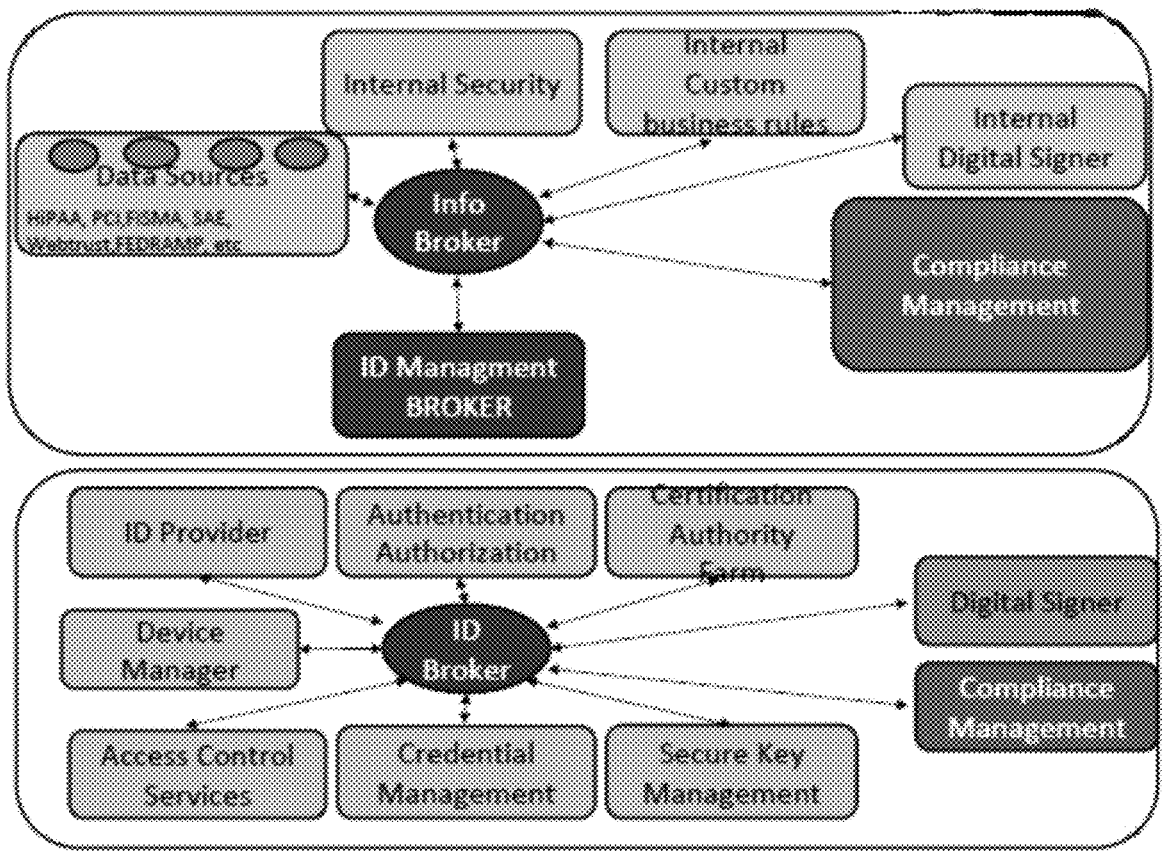
FIG. 27 Actual front end applications and products for a monetization strategy, according to an exemplary embodiment of the invention.
Figure 28:
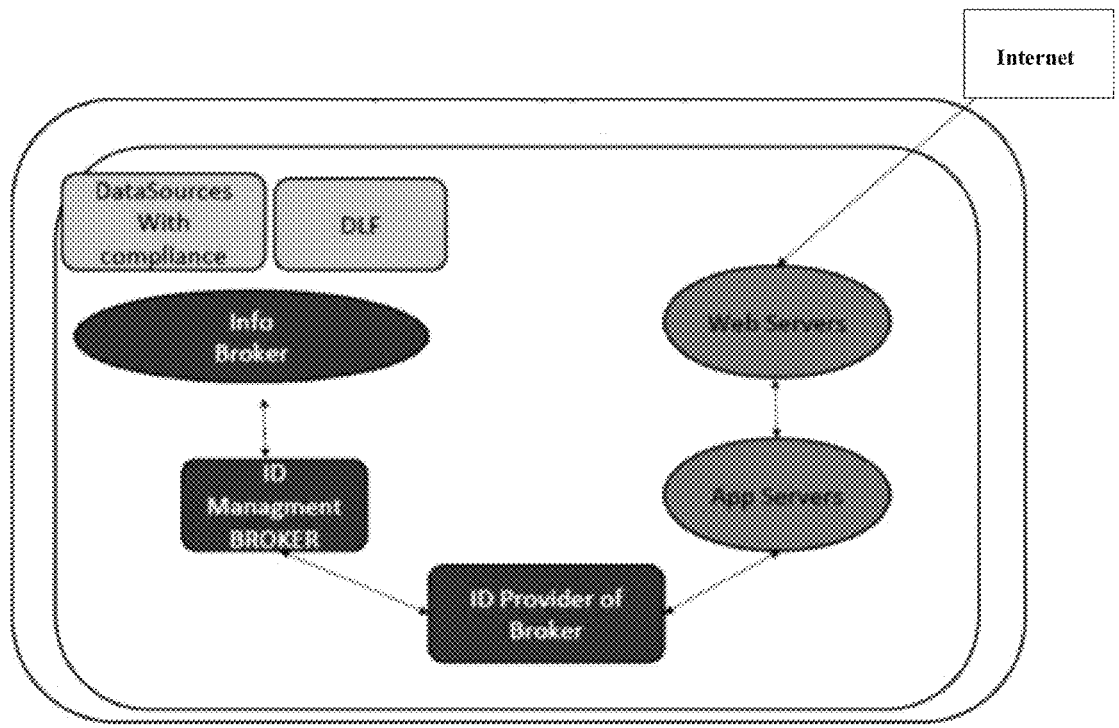
FIG. 28 shows an exemplary Information Broker vis-à-vis ID Broker interaction, according to an exemplary embodiment of the invention.

FIG. 25 illustrates the Information Broker/ID Management broker integration, but with the ID information being shared with third parties (e.g. social media, Electronic health records), etc. FIG. 26 illustrates the components to be integrated within the various portions of the DLF in its commercialization within various businesses. FIG. 27 also shows the topology of the Information Broker and the ID broker. FIG. 28 illustrates a similar topology.

A public key certificate or digital certificate is a digitally signed document that serves to validate the sender's authorization, name and other roles. The document consists of a specially formatted block of data that typically contains the name of the certificate holder (which may be either a user or a system name) and the holder's public key, as well as the digital signature of a certification authority (CA).

In one use, such a document may be used, among uses, for authentication of said user. The certification authority attests that the sender's name is the one associated with the public key in the document. A user ID packet, containing the sender's unique identifier, is sent after the certificate packet.

There are different types of public key certificates for different functions, such as authorization for a specific action or delegation of authority. Public key certificates are part of a public key infrastructure system that deals with digitally signed documents, among others. The other components are public key encryption, trusted third parties (such as the certification, verification validation and registration authorities and implementation guidelines among others), and mechanisms for certificate publication and issuing.

The standards and services that facilitate the use of public-key cryptography and X.509 (and similar other formats) version certificates in a networked environment are collectively called public-key infrastructure (PKI). In any PKI, a certificate authority (CA), is a trusted entity that issues, renews, and revokes certificates for a user's (sometimes called also end entity), who are a person, router, server, or other entity that uses a certificate to identify itself to others in the internet.

Figure 29:
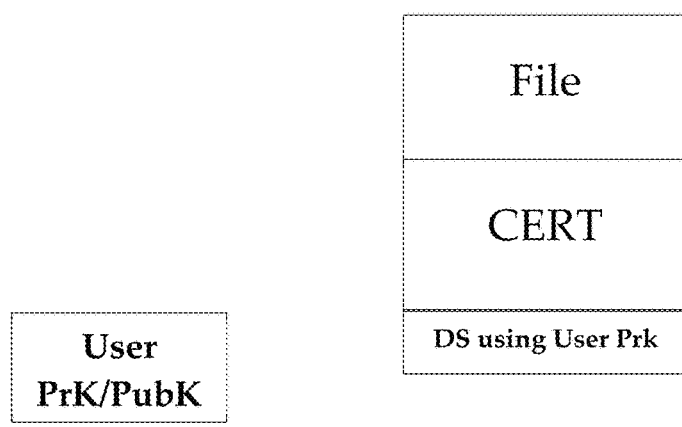
FIG. 29 shows an exemplary digitally signed transaction using today's digital certificate and a user's PrK/PubK keys, according to an exemplary embodiment of the invention.

To participate in a PKI, such users (including as stated above both natural persons, corporation and devices, commonly known as end users) must enroll, or register, with a CA (in this case functioning as a Registration Authority, or RA). The end user typically initiates enrollment by (FIG. 29) generating a public/private key pair, and sending to a Registration Authority (RA) (the RA may or may not be a CA), by sending a request for a Certificate, providing the RA with the user information (Data Fields A through Z), providing the user Public Key (PubK), and digitally signing the file (using the user's Private Key (PrK).

In another embodiment, the example of a digitally signed file it contains the Raw data file, a certificate containing signer user public key and user public data the digital certificate also includes information about the CA and is digitally signed by CA. A digital signature of the file is included and was created by using user private key that matches the public key of the certificate.

The information provided may include one or more of the user's unique ID (e.g. Social Security and/or National Number), email, address, license number(s), servers request, etc., i.e. information expected to be known only by said user. The RA validates the data, typically through other parties, and affirms to the CA that this request is from said user.

Once the RA (or the CA in its capacity as and RA or via a third party RA) uses said provided information to authenticate, confirm, and/or in other fashion confirm said data, establishes the requesting party (user) bona fides. In some cases the CA may require human intervention, including a phone call, interview, examination of notarized documents, biometrics, etc. in order to authenticate the user's bona fides. In other cases the information provided may be sufficient (automatic approval).

In addition to authenticating the user via the above process, the CA uses the public key to ensure "proof of possession"—that is, cryptographic evidence that the certificate request was signed by the holder of the corresponding private key. Finally, the CA issues the certificate, which has the user information (A . . . Z), the user PubK, associated CA information (including technical information about the technology used and the activation/expiration dates for said certificate), and is finally digitally Signed by the CA, including said CA's PubK. (Again, the PrK are never publicly shared). From now on, every time the user wants to establish its bona fides, it simply uses the Certificate to digitally sign documents or otherwise establish its bona fides.

The above process (as shown), is fairly data intensive, and market conditions have forced the setting of said expiration dates to a fairly long period, typically one to two years. Also, once the Certificate (CERT) is issued to a user, he/she/it may use it within the internet at any time. While Certificates are sometimes recalled/cancelled, they are usually accepted as valid.

Figure 30:
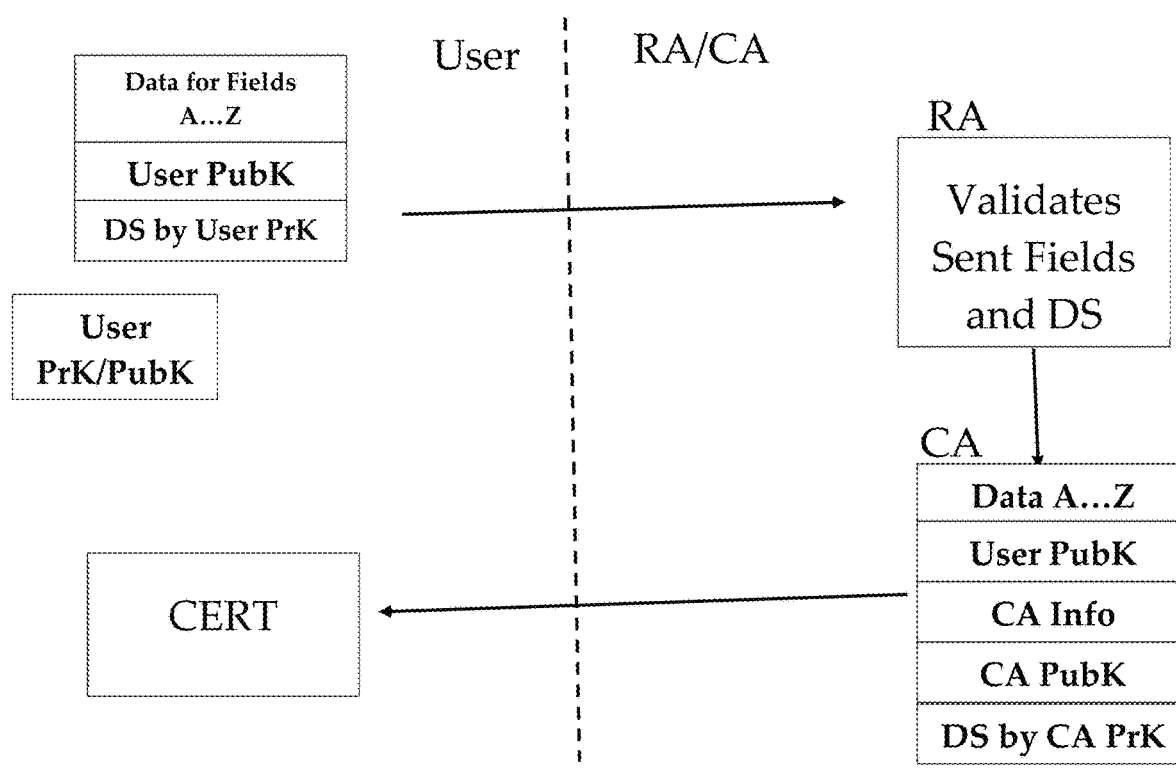
FIG. 30 shows the typical process for generating a CERT, using today's method and technologies, according to an exemplary embodiment of the invention.

When signing a document or transaction (FIG. 30), the user generates an electronic file that includes the action or actionable document (for example a file to be signed 3002, the CERT 3004 and a Hash 3006 that is generated with a combination of the File/CERT and the User PrK (the one paired with the User PubK used in generating the CERT and that is present on said CERT). To validate the validity of said digitally signed document, the receiver need only validate the Hash using the User PubK present in the CERT.

We term as a Certificate authority computer system as the collection of servers, application (apps), and communication links (both secured and/or unsecured and/or combinations thereof) that communicate the pertaining information. When obtaining a PCERT, users must typically send their actual information and/or pointers (in the form of URL or other direct link to files/web-sites/pages, etc., wherein the information resides (not unlike either giving your name and/or a location where your actual name resides). We term this actual information about the user as proxy request data elements, and fields A through Z.

The CA (through a $3^{rd}$ party Registration Authority or other parties) verifies this information, and generate a set of PCERT data elements that are 'related' data fields and/or contents A' . . . Z'. These for example, change your name from Luis to Buho123, or even a unique number or alpha. It is this one or more PCERT data fields (A' up to Z') that are used to generate the PCERT. Such of course, allows the authorized CA to understand that Luis is requesting a TCERT with Luis, but that the PCERT says Buho123, making the PCERT all but invalid for use in the open system in some cases, it also guarantees that TCERTs have the actual data. When generating the PCERT, the ancillary data in some cases may include a new PubK/PrK pair for the user generated by the CA, sometimes not.

When a user requests a TCERT, they identify the data/field names/pointer and/or tokenized data they want in the TCERT, and when this arrives at the CA, said CA matches said A . . . Z data with said A' . . . Z' data for said user (with or without a PCERT as explained below), then proceeds optionally to validate said data A . . . Z at the time of issuance of the TCERT (which may be valid for as long as a CERT, but may also be valid for seconds or less) and may even use MFA to validate that said user is said user. In this fashion, the short duration of the certificate obviates the hard problem of a TCERT's validity two years from now.

In one embodiment, a typical CA operation example has a user provide information to RA/CA so it can be validated by CA, the certificate request is digitally signed by the user local new generated key pair. Once the information is validated and the certificate is created by the CA and is digitally signed by the CA. The new certificate is sent to the user. The certificate lifecycle is managed by the ca with user input.

Figure 31:
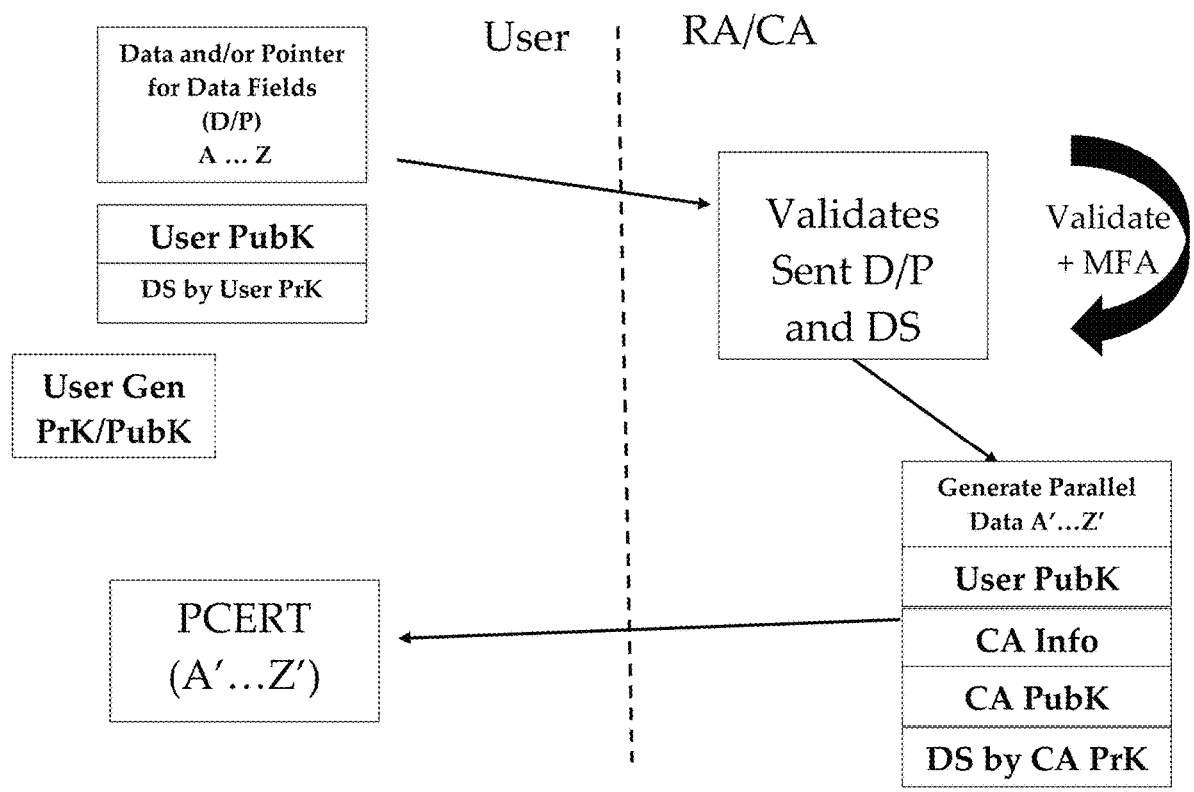
FIG. 31 shows a proposed alternate process for generating a PCERT, according to an exemplary embodiment of the invention.
Figure 32:
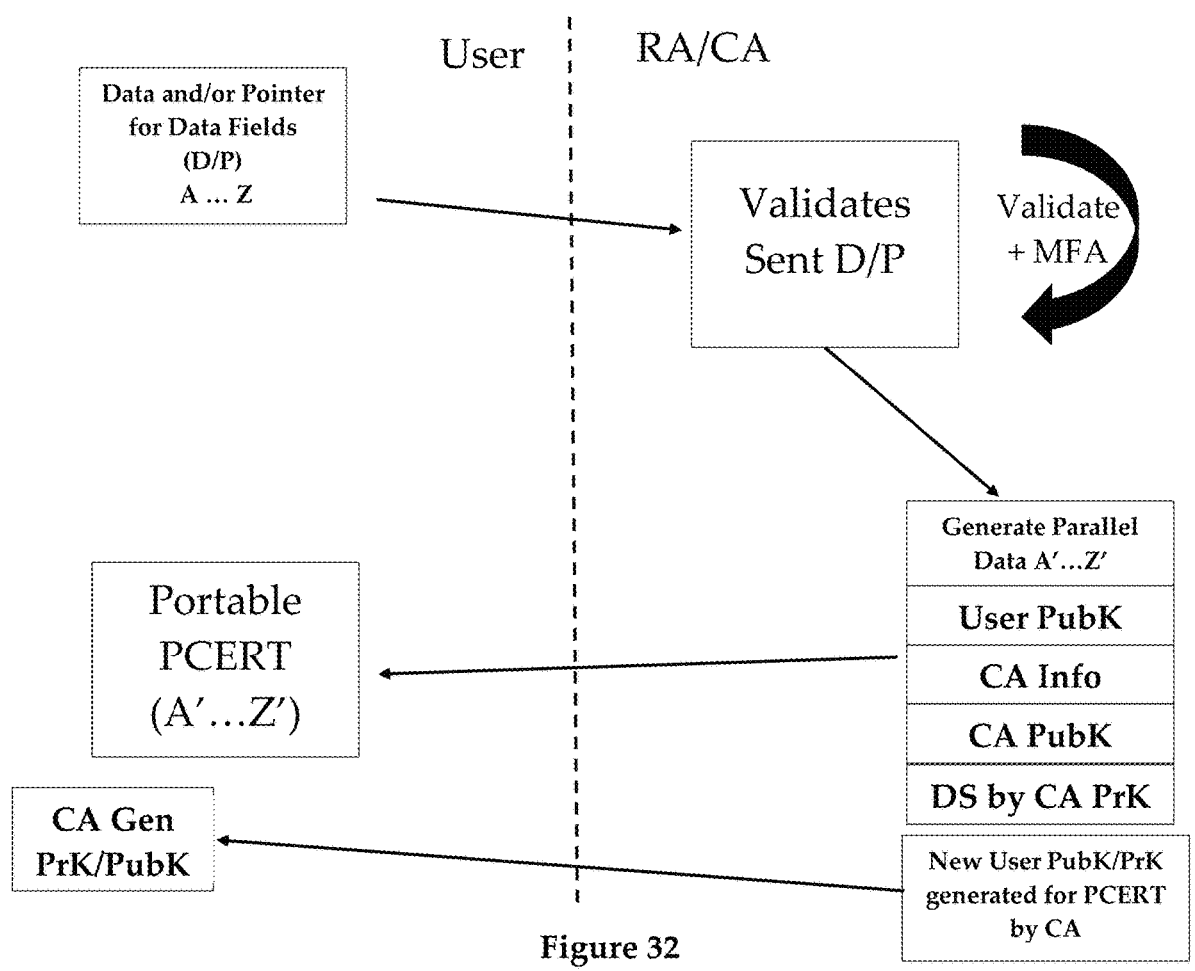
FIG. 32 shows a proposed alternate process for generating a portable PCERT, according to an exemplary embodiment of the invention.

The proposed solution uses the same arrangement for CERTs, but it does so through (FIG. 31-32) the emission of a proxy certificate (PCERT), which would be obtained by the user through a procedure similar to today's Certificate, but would not be intended for use in the 'general population' (that is, to validate 'openly' with others within the Internet), yet would last a significantly long time (as much as today's or longer).

In one embodiment, a PCERT request with locally generated key pair occurs as this. A User using a selection of interfaces) provided by CA including but not limited to software applications, hardware specific devices, webpage, web services, mobile apps, and other electronic possible interfaces, these software application creates the specific data packets and formats as required by the RA/CA. As part of the request process, locally at user device it is generated a key pair and it's private key is used to digitally sign the PCERT request. As part of this process Multiple Factor Authentication can be used if necessary. All of this information is sent to RA/CA by the request interface via secure or unsecure channels, depending on CA and user policies.

Once the information is decoded, verified and or validated following all security protocols, policies and procedures that may include multiple factor authentication depending on transaction or data elements to be validated by RA/CA. The CA proceeds to create a (Proxy Digital Certificate-PCERT) digital certificate with the specific data fields, references, data links, visual references, tokens, and other representation and structures required by CA for the PCERT and user authentication and authorization. The digital certificate is digitally signed by CA and the time of validation is determined by security and transaction policies. All certificate lifecycle including revocation is managed by CA and user depending on the policies mutually agreed.

In one embodiment, when registering and obtaining PCERT, it acts as a proxy authorization and or authentication certificate that can be used when a temporary certificate want to be produced or any other authorized transaction by the user with the CA.

In one embodiment, to obtain the PCERT, a user sends the similar information (where as today, the actual field information, i.e. Actual Name, License Number, Address as in Joe Smith, USPTO Reg. 58,300, One Main Street, Nashua, N.H.) is sent to the CA, is validated by the RA (again, or a CA acting as an RA), and then generates a Proxy Certificate).

In one scenario the user requests a key to be created with keys created on local computer, device, mobile phone, hsm, etc. Information to be validated in RA/CA is sent via a secure or unsecured channel to RA/CA (Said Registration Authority, Certificate Authority and/or combination thereof). Besides the information sent to be validated, validates the information via multiple ways and it can include multiple factor authentication protocols depending on business rules. Using the client certificate request software or hardware a PCERT certificate request is generated using locally generated key pair (PubK/PrK).

Once the RA and/or CA validates the information a PCERT is created and digitally sign by the CA, the fields of data or pointers in the PCERT are only understandable and for use with the CA. PCERT does not contain any data that identifies the user, the only one that can identify the user is the CA. PCERT is delivered to user and is digitally signed by CA.

In another scenario, said PCERT is created with keys created on the CA directly. Information to be validated in RA/CA is sent via a secure or unsecured channel to RA/CA. Once RA & CA validates the information via multiple ways and it can include multiple factor authentication protocols depending on business rules. Keys for the PCERT are created by the CA and digitally sign by the CA, the fields of data or pointers in the PCERT are only understandable and for use with the CA. PCERT does not contain any data that identifies the user, the only one that can identify the user is the CA with internal mechanism. PCERT is delivered to user and is digitally signed by CA. For the use of the PCERT depending on the security rules by user and CA it can require multiple factor authentication when it is used. If desired a user can have multiple PCERT depending on the type of data and security rules.

In one embodiment, the validation in addition requires Multi Factor Authentication, at the time of PCERT issuance. The user then stores the PCERT in their machine for use anytime a Certificate is required. These Certificates for 'open' use are now Transaction Certificates (TCERT).

A TCERT—Temporary Digital Certificate is a digital certificate that has a temporary use of life (Seconds, minutes, hours, days, years) and or limited to a specific transaction or transactions. The CA re-validates in real time the fields prior to generate the TCERT and in case any information is needed based on the policies it manages the relation with the final user so the required information is updated by user.

The TCERT can have various formats of operation and data structures, It mostly use but is not limited to X509 standard since it can includes reference files, references or links to actual certified or approved to display data, it can also contain displayable graphical encoded in example in (encrypted or not 1D (barcode), 2D (DataMatrix, QrCode, PDF417), visual stenography, sound watermark, etc) that can be attached or implemented in the certificate or as an attachment to the file that needs to have the verifiable data. This while many other approved data structures that can be custom based on requirements.

The Validation of the data fields of the TCERT are depending user, organization and or compliance rules for such data. In case a TCERT is using reference data or links, actual data can require multiple factor authentication depending on security policies. Certificate Request Program definition—Cert Request program is a special version that can comply with PCKS10 Standard but is not limited to it since it has various functionalities that expand the security and usability of it.

There are various scenarios for obtaining a TCERT. In one embodiment, the party requesting a TCERT using local generated keys and providing all data elements in the request either by putting the information of the required fields. In this Scenario the CA only verifies that the information sent by the client request APP is correct. It uses the PCERT as an authorization mechanism for the CA to generate a new certificate on behalf the user information on the certificate request. In this case the user uses the client APP or webpage, a new key pair is generated.

The user fills out all the data fields that is going to the actual TCERT, this information is sent via a secure or unsecured channel to the CA. and the request is digitally signed by the new key pair private key. All the transaction apart is digitally signed by the PCERT as part of the authorization and authentication process. The CA receives the information and verifies the following: That the data entered by the user is exactly as the one it has in the internal records. All internal validation policies, security policies, business rules it can use multiple factor authentication depending on security rules and policies by CA and user or organization. When everything is validated the CA generates and digitally signs the TCERT with the CA digital signature.

In another embodiment, the party requesting a TCERT using local generated keys and providing only field names, tokenized field names or tokenized data elements. In this Scenario client APP will have all required security and algorithm mechanism to produce the configurable token that can represent a data field name, or specific data element that the CA will validate prior to produce the new TCERT. In one embodiment, there a request APP sending it. Said APP uses the PCERT as an authorization mechanism for the CA to generate a new certificate on behalf the user information on the certificate request.

In this case the user uses the client APP or webpage, a new key pair is generated. The user fills out all the data fields that is going to the actual TCERT, this information is sent via a secure or unsecured channel to the CA. and the request is digitally signed by the new key pair private key. All the transaction apart is digitally signed by the PCERT as part of the authorization and authentication process. The CA receives the information and verifies the following: That the data entered by the user is exactly as the one it has in the internal records. All internal validation policies, security policies, business rules it can use multiple factor authentication depending on security rules and policies by CA and user or organization. When everything is validated the CA generates and digitally signs the TCERT with the CA digital signature.

Figure 33:
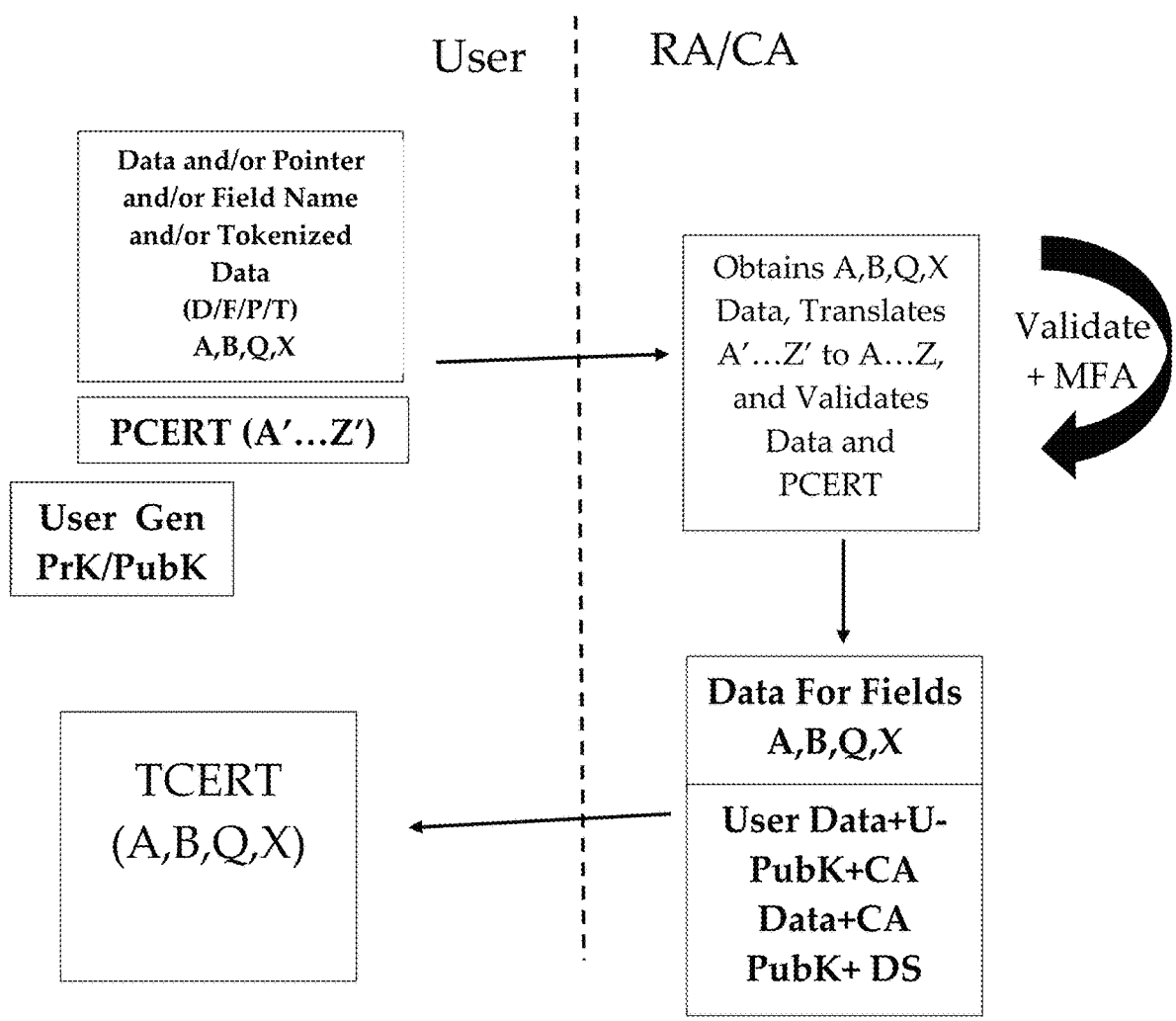
FIG. 33 shows a proposed alternate process for generating a TCERT based on a PCERT, according to an exemplary embodiment of the invention.

In on embodiment, when interested in obtaining a TCERT (FIG. 33), the user contacts the CA with the desired information in the TCERT (again, having the actual data in the fields), and is sent to the CA together with the Proxy. The CA receives said request, and generates the TCERT based on the validity of the user, the Proxy, etc. While TCERTs may be made with any duration of time as validity, they are by nature better suited to have very short durations (say minutes, hours, days). In this fashion, one embodiment may be one where TCERTs are designed to be used by transaction (say when digitally signing an individual US Patent Application document), or by days (TCERT for the week or month), etc.

In an alternate embodiment, a User using a selection of interfaces provided by CA including but not limited to software applications, hardware specific devices, webpage, web services, mobile apps, and other electronic possible interfaces, these software application creates the specific data packets and formats as required by the RA/CA. In this case the key pair of the PCERT is not generated locally in the device. All of this information is sent to RA/CA by the request interfaces via secure or unsecure channels, depending on CA and user policies.

Once the information is decoded, verified and or validated following all security protocols, policies and procedures that may include multiple factor authentication depending on transaction or data elements to be validated by RA/CA. The CA creates a new key pair that contains both the public and private key of the new to be created PCERT. The CA proceeds to create a (Proxy Digital Certificate-PCERT) digital certificate using key pair generated by CA and with the specific data fields, references, data links, visual references, and other representation and structures required by CA for the PCERT and user authentication and authorization. The digital certificate is digitally signed by CA and the time of validation is determined by security and transaction policies.

All certificate lifecycle including revocation is managed by CA and user depending on the policies mutually agreed. Said PCERT is sent in a portable format containing the public and private key (i.e. Pfx, .cer, xml, JSON, any custom format, etc). This portable file can be protected using multiple factor authentication if is necessary.

In an alternate embodiment, when receiving the TCERT request, the CA in addition to validating the Proxy, validates the status (when applicable) of the Data Formats. For example, is your address still the same, has your USPTO Registration expired? Has your Engineering license being revoked? In addition, in another embodiment, the CA may use MFA to authenticate your TCERT. Said MFA includes at least one of the following user interactions: telephonic, password, biometric, token (H/W and/or S/W), Password, Pincode, One Time Password, Biometrics (including Face, Finger, Iris, Veins, Voice and others), Machine generated unique codes, Machine Digital Signature, Machine Digital Signature on a secured cryptographic device token and/or Machine generated Unique Code on Secure Cryptographic Device token, LDAP, other authentication and/or authorization servers.

Once the data is validated and/or MFA'd, the TCERT is issued and sent to the user for his/her/it digital signature in public use. Again, a TCERT is of shorter duration lifecycle, but similar to a regular certificate in that it is intended for use in the open market. That is, TCERT is then used to digitally sign any document that the user is interested in digitally signing.

The above however, provides for additional options when generating the TCERTs that are no available today. In one embodiment, FIG. 33, there is a need for an additional step or interaction between User and CA, but at additional security.

In one embodiment, a User using a selection of interfaces provided by CA including but not limited to software applications, hardware specific devices, webpage, web services, mobile apps, and other electronic possible interfaces, these software application creates the specific data packets and formats as required by the RA/CA. This data can be the data required, and or data field names and or pointers and or tokenized data for data fields content and names. As part of the request process, locally at a user device it is generated a key pair and it's private key is used to digitally sign the TCERT request.

This TCERT request authorization is also digitally signed by the PCERT. As part of this process Multiple Factor Authentication can be used if necessary for the PCERT and or TCERT. All of this information is sent to RA/CA by the request interface via secure or unsecure channels, depending on CA and user policies. The information of the request is decoded, verified and or validated following all security protocols, policies and procedures that may include multiple factor authentication depending on transaction or data elements to be validated by RA/CA.

Figure 34:
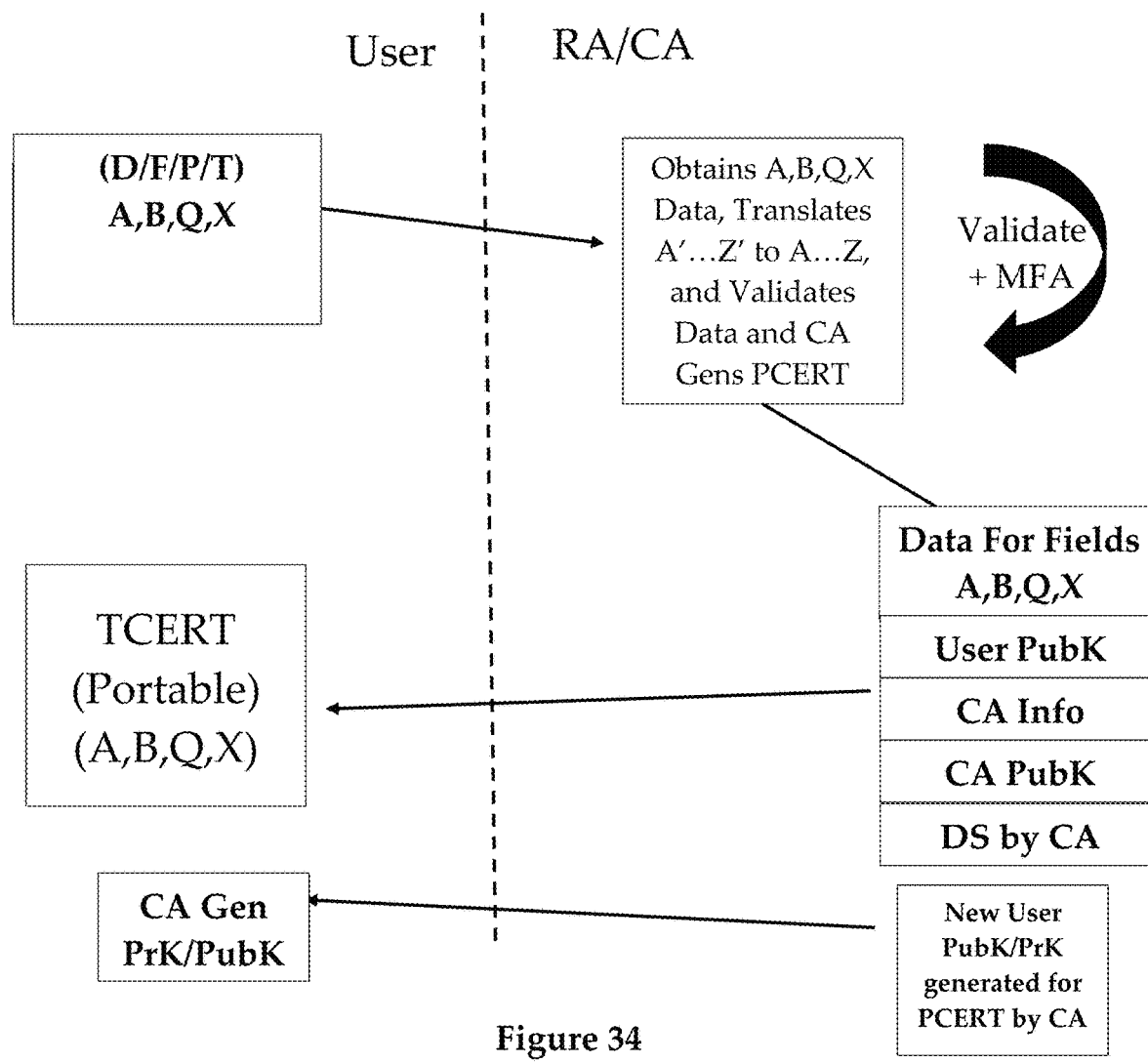
FIG. 34 shows a proposed alternate process for generating a portable TCERT, according to an exemplary embodiment of the invention.

The CA proceeds to create a (Temporary Digital Certificate-TCERT) digital certificate with the specific data fields, references, data links, tokens, visual references, and other representation and structures required by CA for the TCERT and user authentication and authorization. The digital certificate is digitally signed by CA and the time of validation is determined by security and transaction policies. All certificate lifecycle including revocation is managed by CA and user depending on the policies mutually agreed. Explication on types of data for data request or data on certificate—This data can be the data required, and or data field names and or pointers and or tokenized data for data fields content and names The user who desires a TCERT begins by generating a request for a TCERT, by sending a request, specifying that he/she/it would like a TCERT having one or more of the specified data fields (FIG. 34) (but not the specific data to be included in it), which is signed by said User's Proxy. The CA validates that the data fields actual data is still valid (is the Name/License/Address still valid). A point on this, many women change their last name when they marry, and also many computers change their name as part of an acquisition, the above system would allow people to keep their Proxy by simply updating the information with the CA through separate steps.

In one embodiment, the TCERT Request with TCERT key pairs generated on CA and no PCERT Authorization. A Variant scenario is the same scenario as FIG. 34. The only difference that the PCERT digitally signed authorization is sent in the TCERT request process. In such a User using a selection of interfaces provided by CA including but not limited to software applications, hardware specific devices, webpage, web services, mobile apps, and other electronic possible interfaces, these software application creates the specific data packets and formats as required by the RA/CA. This data can be the data required, and or data field names and or pointers and or tokenized data for data field's content and names.

In this case the TCERT key pair is not generated in the user device and the PCERT is not present for the TCERT creation authorization. (In the case of the variant A of this figure the PCERT is present and digitally signed the authorization of the request). As part of the request process, the RA/CA communicates online or offline with the user and as part of this process Multiple Factor Authentication can be used if necessary for the TCERT authorization with the required fields. All of this information is sent to RA/CA by the request interface via secure or unsecure channels, depending on CA and user policies.

The request and information is decoded, verified and or validated following all security protocols, policies and procedures that may include multiple factor authentication depending on transaction or data elements to be validated by RA/CA. The CA creates a new key pair that contains both the public and private key of the new to be created TCERT. The CA proceeds to create a (Temporary Digital Certificate-TCERT) digital certificate with the specific data fields, references, data links, tokens, visual references, and other representation and structures required by CA and requested and authorized by user.

The digital certificate is digitally signed by CA and the time of validation is determined by security and transaction policies. All certificate lifecycle including revocation is managed by CA and user depending on the policies mutually agreed. Said TCERT is sent in a portable format containing the public and private key (i.e. Pfx, .cer, xml, JSON, any custom format, etc) this portable file can be protected using multiple factor authentication if it is necessary.

In another embodiment, the CA validates the data and optionally performs one or more MFA's, and generates a TCERT that has the actual A, B, X, Q fields data (that is, actual names, address, etc.), which goes to the user. The User then takes the actual A, B, Q, X data, and uses its proxy to generate a TCERT request to the CA (similar to the example above). In this case, the user may use its original PrK/PubK, or generate a new set of keys for this transaction. The CA takes the ABXQ/Proxy package, and generates a TCERT, which the user may use to sign his/her/it documents. Note in both cases above, the user is in FULL control of generating PrK/PubK pairs, not needing to risks these in transmission.

Figure 35:
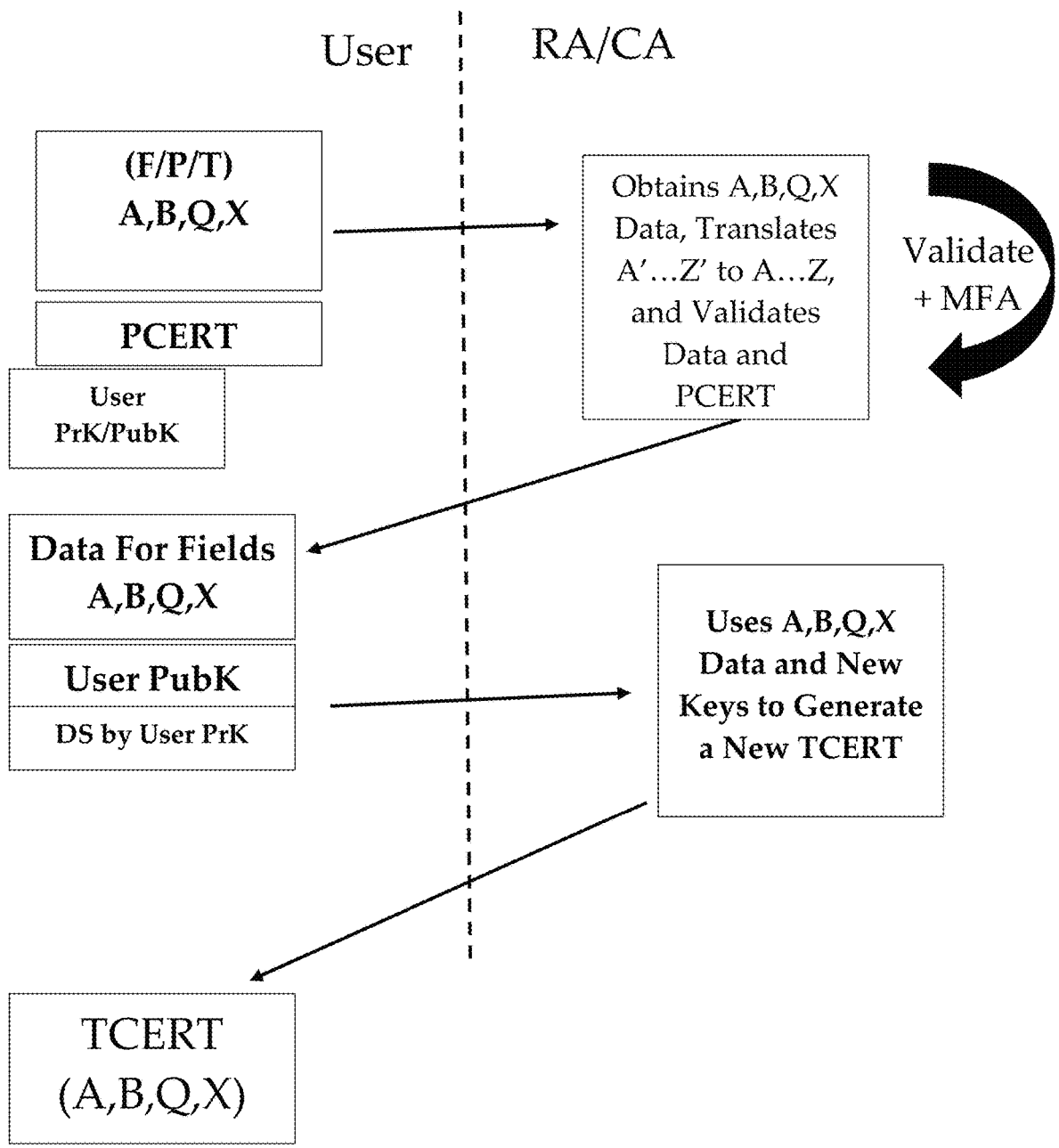
FIGS. 35-36 shows alternate proposed processes for generating a TCERT, according to an exemplary embodiment of the invention.

In another embodiment, the actual fields (FIG. 35) are not even the names of the fields, but one or more pointers to secure locations where the field identification and/or actual field information is held. In this fashion, the user does not even identify the actual nature of the information to be contained within the field in any transmission (it would be easier to crack the code for a field that is known to be numeric (say SSN or USPTO Registration Number).

In one embodiment, we see a request that does not include actual data fields of the request, it only has the data field names and or data pointers and or tokenized data fields name or data. The keys of the TCERT are generated in the User device. In a variant the only difference that the request does not include the PCERT digitally signed authorization). In either case, a User using a selection of interfaces provided by CA including but not limited to software applications, hardware specific devices, webpage, web services, mobile apps, and other electronic possible interfaces, these software application creates the specific data packets and formats as required by the RA/CA. This data can be the data field names and or pointers and or tokenized data for data field's content and names, in this case the RA/CA will send the user the actual data fields values that is going to be used in the TCERT request.

As part of the data request process, the RA/CA communicates online or offline with the user and as part of this process Multiple Factor Authentication can be used if necessary for the PCERT authorization with the required fields. All of this information request of data is sent to RA/CA by the request interface via secure or unsecure channels, depending on CA and user policies. In this case the request is to download from the RA/CA the actual data that will be used to request the TCERT. This information request will be authorized and signed by the PCERT (In the case of the variant A of this figure the PCERT is NOT present)

The request for TCERT data values download and information is decoded, verified and or validated following all security protocols, policies and procedures that may include multiple factor authentication depending on transaction or data elements to be validated by RA/CA. The RA/CA sends the data of the fields that will be used by the user to request the actual TCERT. This information is sent via secured or unsecured channel depending on RA/CA and user policies. The user now using any of the interfaces now create the TCERT request with actual all data elements.

As part of the request process, locally at a user device it is generated a key pair and it's private key is used to digitally sign the TCERT request. Using the interfaces the USER TCERT REQUEST IS SENT TO RA/CA and is approved and digitally signed by the PCERT (in variant a of this scenario the PCERT is not present). Since all data has been already validated for downloading the data that is being use in the TCERT request, there is no need to revalidate once again to create the TCERT.

The CA proceeds to create a (Temporary Digital Certificate-TCERT) digital certificate with the specific data fields, references, data links, tokens, visual references, and other representation and structures required by CA and requested and authorized by user. The digital certificate is digitally signed by CA and the time of validation is determined by security and transaction policies. All certificate lifecycle including revocation is managed by CA and user depending on the policies mutually agreed. The TCERT is sent to user via interface and under secured or unsecured channels depending on CA and user security policies.

Figure 36:
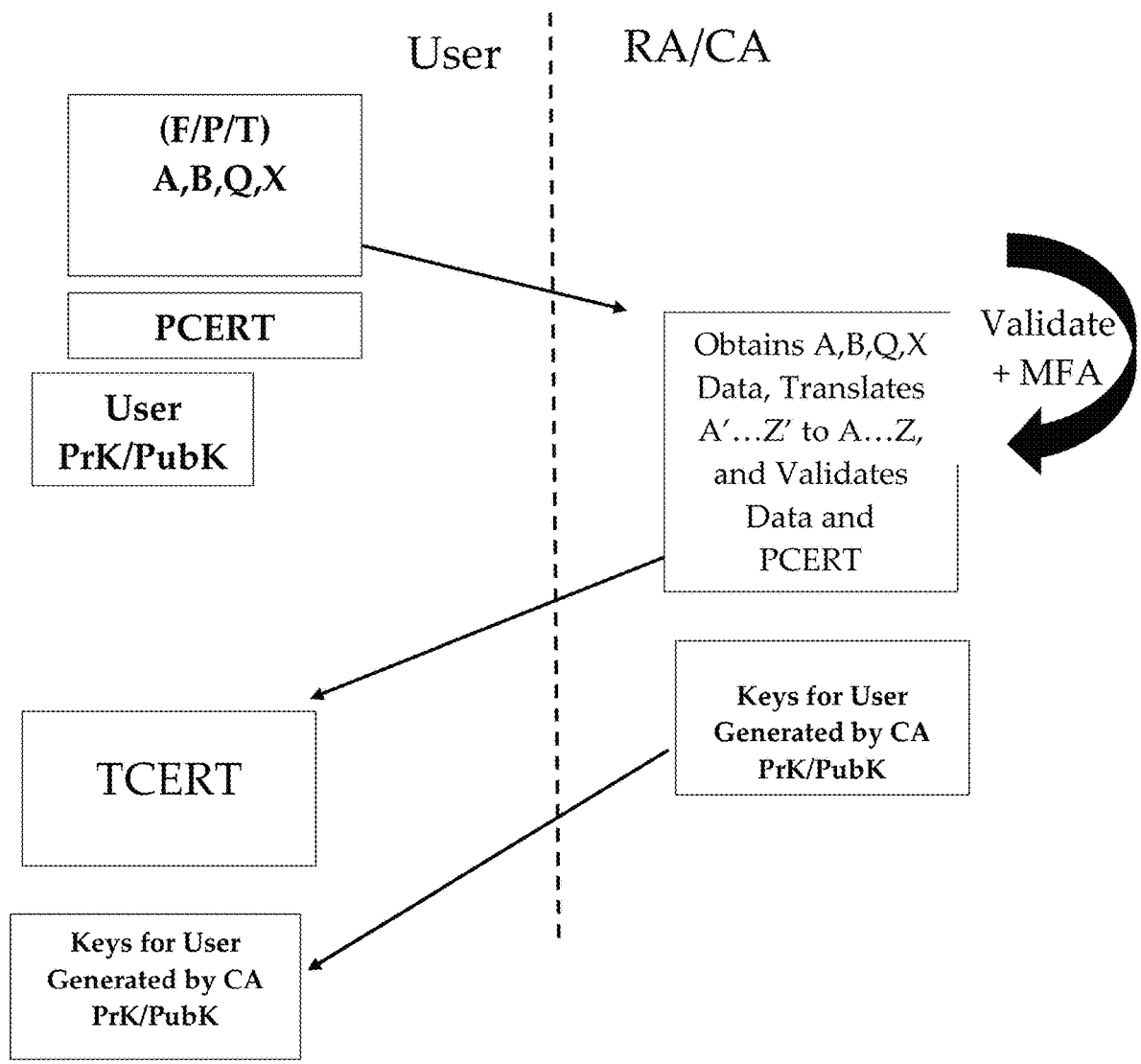

In one embodiment, the system obviates the need for the extra back/forth step (FIG. 36) by generating TCERTs that have the full information from the file, and sending the TCERT and the PrK/PubK pair keys used to generate them to the user a the first step. The pointer within said certificate may be one to the Viral test results in an EHR held within the Medical system.

In one embodiment, the request does not include actual data fields of the request, it only has the data field names and or data pointers and or tokenized data fields name or data.

The keys of the TCERT are generated in the CA. and a PCERT is used to authorize the TCERT creation. (In the variant a of this scenario the PCERT is not used for this authorization. A User using a selection of interfaces provided by CA including but not limited to software applications, hardware specific devices, webpage, web services, mobile apps, and other electronic possible interfaces, these software application creates the specific data packets and formats as required by the RA/CA. This data can be the data field names and or pointers and or tokenized data for data field's content and names. As part of the data request process, the RA/CA communicates online or offline with the user and as part of this process Multiple Factor Authentication can be used if necessary for the PCERT authentication and authorization with the required fields.

The Information required is sent to RA/CA by the request interface via secure or unsecure channels, depending on CA and user policies. In this case the request is to request the TCERT with the CA filling out all of the values of the TCERT including the key pair. This information request will be authorized and signed by the PCERT.

In another embodiment, the PCERT is NOT present and the request for TCERT with its data values and information is decoded, verified and or validated following all security protocols, policies and procedures that may include multiple factor authentication depending on transaction or data elements to be validated by RA/CA. The CA Creates a new key pair that will be used for the TCERT. The CA proceeds to create a (Temporary Digital Certificate-TCERT) digital certificate with the specific data fields, references, data links, tokens, visual references, and other representation and structures required by CA and requested and authorized by user.

The digital certificate is digitally signed by CA and the time of validation is determined by security and transaction policies. All certificate lifecycle including revocation is managed by CA and user depending on the policies mutually agreed. The TCERT is sent to user via interface and under secured or unsecured channels depending on CA and user security policies.

In another embodiment, the actual field identification is not a pointer, but a token identifying it for a limited amount of time, so that the pointer is only valid during the limited window.

In one embodiment, we have a special certificate request platform—for all of the scenarios the certificate and information request is done via an integrated platform. It includes multiple component and it's not limited to secure cryptographic functions, hardware security modules, Secure Random Number generators and can be implemented in multiple Operating System including custom programmed hardware devices.

As part of the formatting of the request, the system can provide the field data names, links to actual data so it can be verified, secured links with credentials so information can be accessed, visual data elements represented in either encrypted or not encrypted 1 and 2D barcode, QRCode, visual stenography and or digital watermarks that can be read via an electronic device and or human eye, or only a specific electronic device with the unique characteristic to red and decode the data.

Tokenization example is defined as a Time based One-time password algorithm (OTP) defined in RFC6238 and namely the HMAC-Based One-time Password, as defined on RFC4228 both of this examples can be located by the Internet Engineering Task Force. In the example and context of this transaction One Time Password Tokens can be used to hide data that only client and server can understand. For example data field name, authorization and authentication, and other specific required data elements for the transaction to occur.

For example let's assume a certificate request needs to have the specific fields that need to be validated and implemented in the new certificate provided by the CA. In this scenario in the request instead of saying for example (Request, fields (Name, Last Name, Title, link to file), Verify (authentication code1, authorization code2)).

An example of the request explained above can look similar like this (Request, fields (11234, 44214, 223467, 213464), Verify (5567543, 1223567))

Taking in consideration that numeric or alphanumeric code change in a configurable time set like specified in the RFC or any other custom protocol. This methodology is different than regular or typical encryption since it's time based. It is recognize that multiple keys depending on the final implementation in a case by case basis, this would be required and each interface implementation may protect this secret keys in different ways via software, hardware, hardware security modules, specialized devices, etc. It is also taken into consideration secure key management protocols for sharing of any key or keys.

All communication with the Server from client and vice versa can be fully encrypted using multiple encryption tunnels and protocols such as: SSL, TLS, SSH, VPN, IPSec and other protocols either standard or custom programmed security protocols that include symmetric, Asymmetric and any other type of encryption and methodologies that protects data from being read by a unauthorized third party. On example of a security protocol is the Tokenized sharing mentioned here above and any other data secure transfer custom made to identify and protect data.

It is also provided that for the ENCAB data communication, protocols such as: (TAT, TAP, etc), multiple authentication mechanism, digital signing tools and information sharing can have the capacity to integrate with the Information Broker, Identity Broker and Digital Life Framework software and hardware devices.

As part of the ENCAB process digitally signing files data and transaction and keeping track of the transaction is important for transaction monitoring and integrity. This is why the ENCAB can include if necessary a separate file and data signing tools for online and offline cases. For this process once the TCERT is provided to the user the user can digitally sign any document or file using the CA singing tools. The digital signing tools are via desktop application, web based application and or web services or other electronic services. It provides the capacity of multiple factor authentication every time a document would be signed, this based on the system configuration and security policies to be synchronize with the ENCAB.

In the case that the signing tools digitally signs the document online using a portable CERT FORMAT hosted online by the digital signing tool provider. A digital authorization form, data, tag can be digitally signed by either a PCERT, TCERT or authorized CERT. Multiple Factor authentication can be used for the authorization form signature implementation. The signing tool can also provide a visual reference (1D, 2D, QR code, visual stenography, Watermarks, etc) separate from the ENCAB but also can synchronize with the ENCAB references so there is total tracking not only on the TCERT creation and lifecycle process, but total integrity on the TCERT being used in a specific document and or transaction. This visual references can be used to verify not only data and validity of transaction but also references and attachments that can be verified. With this visual reference also other type of business transaction can be achieved like business lifecycles with transaction void capabilities and dynamic revocation. All of this with same security protocols as Information broker, ENCAB and or independent policies and procedures.

In another scenario of online signing the client application obtains the hash of the document and is securely sent to the signing server, in that case the hash of the file is digitally signed by the server and sent back to the client application. The client application takes the hash and digital signature and implements the signature either in an embedded format or opaque signature. Second factor authentication can be used if necessary. Since the hash is the only information transmitted there is no obligation for the PCERT or TCERT. Depending on the security polices can be used.

In the case there is a client application that can digitally sign on the user device, a TCERT or CERT can be used and the transaction record and references can be synchronize with the online service. Note that in some cases, data elements are define as data that is being hidden

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A computerized system for managing digital certificates, said computerized system comprising:
one or more communicatively coupled computer processors, said one or more computer processors forming a certificate authority computer system (CACS) configured to perform the steps of:
receiving, at said computer system, a request for an online or offline authorization (OOA) request, said OOA request containing one or more OOA request data elements, said OOA request data elements comprising the data for each user related data field and/or a pointer to the location of said data, said user data information being required by the computer system to accomplish (directly or via third parties having proper compliance requirements) the one or more registration validation actions necessary to establish the bona fides of said user in real time and to perform said user registration within the system, as well as any information and/or validation information provided by an external or internal device with geolocation capabilities;

providing, upon said bona fides satisfaction, said user with said OOA request, requested ancillary data element and one or more OOA requested data elements associated with said one or more OOA request data elements;

receiving, by said Certificate Authority computer system (CACS), a request for a Transactional Digital Certificate (TCERT) from a user, said request containing the desired one or more TCERT user data elements and establishing the existence of a valid OOA data request, performing data validation of one or more of said TCERT request data elements, and/or said OOA data elements, and upon acceptance generating said TCERT digital certificate and TCERT ancillary data for said user;

transmitting, by said Certificate Authority computer system, said TCERT digital certificate and any appropriate TCERT ancillary data to said user.

2. The computerized system of claim 1 wherein;

said TCERT request data elements are comprised of one or more of the following possible TCERT data elements; actual user data and/or a pointer to the location of said user data and/or user data field names and/or tokenized values and/or visual references to data said geolocation device includes devices such as beacons or fortified beacons; and if a portable OOA data request and/or TCERT is desired, said OOA data request ancillary data and/or said TCERT ancillary data optionally contains a Certificate Authority generated Private Key/Public key pair or equivalent security code or keys.

3. The computerized system of claim 2 further comprising;

said request for a certificate validation of said TCERT request data elements includes establishing the validity of each said TCERT data element at the time of said TCERT request.

4. The computerized system of claim 3 further wherein;

said TCERT is one of various formats of operation and data structures, associated but not limited to the X509 standard, reference files, references and/or links to actual certified or approved to display data, displayable graphical encoded data within a one-dimensional (1D barcode, two-dimensional (2D barcode or symbology, visual stenography, sound watermarks or other similar digital media which is attached or implemented in the TCERT or as an attachment to the file that needs to have the verifiable data.

5. The computerized system of claim 4 further comprising;

said certificate validation of said TCERT request data elements include in addition the real-time multi-factor authentication (MFA) of said user, wherein said MFA includes at least one of the following user interactions:

telephonic, password, biometric, token (Hardware and/or Software), Password, Pincode, One Time Password, Biometrics (including Face, Finger, Iris, Veins, Voice and others), Machine generated unique codes, Machine Digital Signature, Machine Digital Signature on a secured cryptographic device token and/or Machine generated Unique Code on Secure Cryptographic Device token, LDAP, other authentication and/or authorization servers/services.

6. The computerized system of claim 2 further comprising;

said request for a certificate validation of said TCERT request data elements include establishing the validity of each said TCERT data element at the time of said TCERT request; and said certificate validation of said TCERT request data elements include in addition the real-time multi-factor authentication (MFA) of said user, wherein said MFA includes at least one of the following user interactions:

telephonic, password, biometric, token (H/W and/or S/W), Password, Pincode, One Time Password, Biometrics (including Face, Finger, Iris, Veins, Voice and others), Machine generated unique codes, Machine Digital Signature, Machine Digital Signature on a secured cryptographic device token and/or Machine generated Unique Code on Secure Cryptographic Device token, LDAP, other authentication and/or authorization servers/services.

7. The computerized system of claim 6 further wherein;

said TCERT is one of various formats of operation and data structures, associated but not limited to the X509 standard, reference files, references and/or links to actual certified or approved to display data, displayable graphical encoded data within a one-dimensional (1D barcode, two-dimensional (2D barcode or symbology, visual stenography, sound watermarks or other similar digital media which is attached or implemented in the TCERT or as an attachment to the file that needs to have the verifiable data.

8. A computerized system for managing digital certificates, said computerized system comprising:

one or more communicatively coupled computer processors, said one or more computer processors forming a Certificate authority computer system (CACS) or equivalent configured to perform the steps of:

receiving, at said Certificate Authority computer system or equivalent, an online or offline authorization (OOA) request data element validation from a user desiring validation from said Certificate Authority of one or more of said OOA request data elements, said request containing one or more OOA request data elements comprising the data for each user related data field and/or a pointer to the location of said data, said user data information being required by the computer system to accomplish (directly or via third parties having proper compliance requirements) the one or more registration validation actions necessary to establish the bona fides of said user in real time and to perform said user registration within the system, as well as any information and/or validation information provided by an external or internal device with geolocation capabilities;

providing, upon said bona fides satisfaction, said user, OOA request ancillary data and one or more of the OOA request data elements associated with said one or more OOA requested data elements;

receiving, by said Certificate Authority computer system, a request for a Transactional Digital Certificate (TCERT) from a user, wherein said requested TCERT request data elements are comprised of one or more of the following possible TCERT data elements: a pointer to the location of said user data and/or user data field names and/or tokenized values and/or visual references to data;

performing certificate validation of one or more of said TCERT request data elements and/or said OOA request data elements, and upon acceptance transmitting to said user the values of the data fields included in said TCERT request;

transmitting, to said Certificate Authority a digitally signed request including said Certificate Authority provided data values, said user Public key and digitally signed by the User;

receiving, said data from said user, and generating a TCERT using said information; and transmitting, by said Certificate Authority computer system, said TCERT digital certificate and any appropriate TCERT ancillary data to said user.

9. The computerized system of claim 8 further comprising;

said request for a certificate validation of said TCERT request data elements include establishing the validity of the data in each said data element at the time of said TCERT emission.

10. The computerized system of claim 9 further wherein;

said TCERT is one of various formats of operation and data structures, associated but not limited to the X509 standard, reference files, references and/or links to actual certified or approved to display data, displayable graphical encoded data within a one-dimensional (1D barcode, two-dimensional (2D barcode or symbology, visual stenography, sound watermarks or other similar digital media which is attached or implemented in the TCERT or as an attachment to the file that needs to have the verifiable data.

11. The computerized system of claim 10 further comprising;

said certificate validation of said TCERT request data elements include in addition the real-time multi-factor authentication (MFA) of said user, wherein said MFA includes at least one of the following user interactions:

telephonic, password, biometric, token (Hardware and/or Software), Password, Pincode, One Time Password, Biometrics (including Face, Finger, Iris, Veins, Voice and others), Machine generated unique codes, Machine Digital Signature, Machine Digital Signature on a secured cryptographic device token and/or Machine generated Unique Code on Secure Cryptographic Device token, LDAP, other authentication and/or authorization servers/services.

12. A method of managing digital certificates, by a computer system, said method comprising the steps of:

providing one or more communicatively coupled computer processors, said one or more computer processors forming a certificate authority computer system (CACS) configured to perform the steps of:

receiving, at said computer system, a request for an online or offline authorization (OOA) request, said OOA request containing one or more OOA request data elements, said OOA request data elements comprising the data for each user related data field and/or a pointer to the location of said data, said user data information being required by the computer system to accomplish (directly or via third parties having proper compliance requirements) the one or more registration validation actions necessary to establish the bona fides of said user in real time and to perform said user registration within the system, as well as any information and/or validation information provided by an external or internal device with geolocation capabilities;

providing, upon said bona fides satisfaction, said user with said OOA request, requested ancillary data element and one or more OOA requested data elements associated with said one or more OOA request data elements;

receiving, by said Certificate Authority computer system, a request for a Transactional Digital Certificate (TCERT) from a user, said request containing the desired one or more TCERT user data elements and establishing the existence of a valid OOA data request, performing data validation of one or more of said TCERT request data elements, and/or said OOA data elements, and upon acceptance generating said TCERT digital certificate and TCERT ancillary data for said user;

transmitting, by said Certificate Authority computer system, said TCERT digital certificate and any appropriate TCERT ancillary data to said user.

13. The method of claim 12 wherein;

said request for a certificate validation of said TCERT request data elements includes establishing the validity of each said TCERT data element at the time of said TCERT request.

14. The method of claim 13 wherein;

said TCERT is one of various formats of operation and data structures, associated but not limited to the X509 standard, reference files, references and/or links to actual certified or approved to display data, displayable graphical encoded data within a one-dimensional (1D barcode, two-dimensional (2D barcode or symbology, visual stenography, sound watermarks or other similar digital media which is attached or implemented in the TCERT or as an attachment to the file that needs to have the verifiable data.

15. The method of claim 14 wherein;

said certificate validation of said TCERT request data elements include in addition the real-time multi-factor authentication (MFA) of said user, wherein said MFA includes at least one of the following user interactions:

telephonic, password, biometric, token (Hardware and/or Software), Password, Pincode, One Time Password, Biometrics (including Face, Finger, Iris, Veins, Voice and others), Machine generated unique codes, Machine Digital Signature, Machine Digital Signature on a secured cryptographic device token and/or Machine generated Unique Code on Secure Cryptographic Device token, LDAP, other authentication and/or authorization servers/services.

16. The method of claim 15 further comprising;

said request for a certificate validation of said TCERT request data elements include establishing the validity of each said TCERT data element at the time of said TCERT request; and said certificate validation of said TCERT request data elements include in addition the real-time multi-factor authentication (MFA) of said user, wherein said MFA includes at least one of the following user interactions:

telephonic, password, biometric, token (Hardware and/or Software), Password, Pincode, One Time Password, Biometrics (including Face, Finger, Iris, Veins, Voice and others), Machine generated unique codes, Machine Digital Signature, Machine Digital Signature on a secured cryptographic device token and/or Machine generated Unique Code on Secure Cryptographic Device token, LDAP, other authentication and/or authorization servers/services.

* * * * *